(12) United States Patent (10) Patent No.: US 9,122,025 B2
Ishikawa et al. (45) Date of Patent: Sep. 1, 2015

(54) OPTICAL MODULE

(71) Applicant: FURUKAWA ELECTRIC CO., LTD., Chiyoda-ku, Tokyo (JP)

(72) Inventors: Yozo Ishikawa, Tokyo (JP); Hideyuki Nasu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/260,316

(22) Filed: Apr. 24, 2014

(65) Prior Publication Data

US 2014/0233897 A1 Aug. 21, 2014

Related U.S. Application Data

(63) Continuation of application No. PCT/JP2012/075621, filed on Oct. 3, 2012.

(30) Foreign Application Priority Data

Oct. 26, 2011 (JP) .................................. 2011-234597
May 11, 2012 (JP) .................................. 2012-109888

(51) Int. Cl.
*G02B 6/36* (2006.01)
*G02B 6/42* (2006.01)

(52) U.S. Cl.
CPC ............ *G02B 6/4204* (2013.01); *G02B 6/4292* (2013.01); *G02B 6/42* (2013.01);
(Continued)

(58) Field of Classification Search
CPC ...... G02B 6/42; G02B 6/4214; G02B 6/4206; G02B 6/4249; G02B 6/4204; G02B 6/4292; G02B 6/4246
USPC ......................................... 385/14–15, 88–94
See application file for complete search history.

(56) References Cited

U.S. PATENT DOCUMENTS 5,023,447 A 6/1991 Masuko et al.
5,515,468 A 5/1996 DeAndrea et al.
(Continued)

FOREIGN PATENT DOCUMENTS

JP 321908 A 1/1991
JP 6273641 A 9/1994
(Continued)

OTHER PUBLICATIONS

International Search Report for PCT/JP2012/075621 mailed Nov. 6, 2012.
(Continued)

*Primary Examiner* — Ryan Lepisto
*Assistant Examiner* — Guy Anderson
(74) *Attorney, Agent, or Firm* — Lowe Hauptman & Ham, LLP

(57) ABSTRACT

A prism/lens array (25) in the present invention is a grass prism having an approximately 45 degrees tapered part. A plurality of lenses (31) are provided side by side on the front surface of the prism/lens array (25). A pair of protrusions (33) are formed on both sides of lenses (31) on the surface on which the lenses (31) are provided. The protrusions (33) are formed in the top-bottom direction of the prism/lens array (25) and roughly V-shaped cross sections. Grooves (35) are provided in an inside surface of a prism-securing part (19), in areas corresponding to the protrusions (33). The grooves (35) are shaped such that the protrusions (33) can fit into the grooves; for example, the grooves could have roughly V-shaped cross sections.

12 Claims, 20 Drawing Sheets

(52) U.S. Cl.
CPC .............. *G02B 6/4206* (2013.01); *G02B 6/428* (2013.01); *G02B 6/4214* (2013.01); *G02B 6/4246* (2013.01); *G02B 6/4249* (2013.01); *G02B 6/4255* (2013.01); *G02B 6/4269* (2013.01)

(56) References Cited

U.S. PATENT DOCUMENTS

| | | | |
|---|---|---|---|
| 6,934,450 | B2 | 8/2005 | Hiramatsu |
| 7,399,125 | B1 * | 7/2008 | Whaley et al. ................. 385/92 |
| 7,441,965 | B2 * | 10/2008 | Furuno et al. .................. 385/93 |
| 2004/0042739 | A1 | 3/2004 | Maeno |
| 2004/0091218 | A1 | 5/2004 | Haasteren |
| 2005/0117853 | A1 * | 6/2005 | Murali et al. .................. 385/88 |
| 2005/0141823 | A1 | 6/2005 | Han et al. |
| 2005/0175347 | A1 * | 8/2005 | Ray et al. ........................ 398/88 |
| 2006/0159405 | A1 * | 7/2006 | Yajima ............................ 385/88 |
| 2007/0140627 | A1 * | 6/2007 | Lu .................................... 385/89 |
| 2007/0297729 | A1 | 12/2007 | Kodama et al. |
| 2008/0008419 | A1 | 1/2008 | Krahenbuhl et al. |
| 2008/0166136 | A1 * | 7/2008 | Birincioglu et al. .......... 398/212 |
| 2008/0232737 | A1 * | 9/2008 | Ishigami et al. ................ 385/14 |
| 2009/0028575 | A1 * | 1/2009 | Epitaux et al. ................ 398/139 |
| 2010/0020421 | A1 | 1/2010 | Shimmo et al. |
| 2012/0027345 | A1 * | 2/2012 | Castagna et al. ................ 385/33 |
| 2013/0343698 | A1 * | 12/2013 | Ko .................................... 385/14 |
| 2014/0153881 | A1 * | 6/2014 | Liff et al. ........................ 385/89 |

FOREIGN PATENT DOCUMENTS

| | | |
|---|---|---|
| JP | 8-36774 A | 2/1996 |
| JP | 2004191564 A | 7/2004 |
| JP | 200531556 A | 2/2005 |
| JP | 2006178001 A | 7/2006 |
| JP | 2010164856 A | 7/2010 |
| JP | 201117924 A | 1/2011 |
| WO | 2006/047896 A1 | 5/2006 |
| WO | 2011/077723 A1 | 6/2011 |

OTHER PUBLICATIONS

Office Action issued Mar. 2, 2015, corresponding to Chinese patent application No. 201280040863.0.
Extended European Search Report dated Jun. 9, 2015, corresponding to European patent application No. 12844149.0.

* cited by examiner (a)

(b)

(a)

(b)

(a)

(b)

(a)

(b)

(c)

(a)

(b)

OPTICAL MODULE

RELATED APPLICATIONS

The present application is a continuation of Application Number PCT/JP2012/075621, filed Oct. 3, 2012, which claims priority from, Japanese Applications Numbers 2011-234597, filed Oct. 26, 2011, and 2012-109888, filed May 11, 2012, the disclosure of each application is hereby incorporated by reference herein in their entirety.

TECHNICAL FIELD

The present invention relates to an easy-to-align optical module that is small, thin, and highly heat-resistant.

BACKGROUND ART

Conventionally, small and thin optical modules which can be implemented in small transceivers used for optical communications are developed. In order to make optical modules thinner, a prism/lens array or the like is used to change the direction of the light emitted from an optical element to the light path of the optical module 90 degrees.

Such a prism/lens array is disclosed as a light-path conversion optical coupling device in the Patent Document 1. The optical coupling device comprises a resin molded body having two surfaces meeting at right angles to each other and a total reflective surface which is at an angle of about 45 degrees to the two surfaces, wherein each of the two surfaces has a plurality of integrally formed collimating lenses and guide holes formed thereon to insert guide pins for connecting with optical connectors and the like.

The Patent Document 2 discloses an optical module comprising: a circuit board which has a level difference of an upper stage and a lower stage in the vertical direction to the surface of the circuit board, an optical waveguide circuit having a waveguide disposed on the upper stage of the circuit board; an optical element disposed on the lower stage of the circuit board; and a glass-made optical reflection element which optically couples the optical waveguide circuit and the optical element.

PRIOR ART DOCUMENTS

Patent Documents

[Patent Document 1] Japanese Unexamined Patent Application Publication No. 2005-31556
[Patent Document 2] Japanese Unexamined Patent Application Publication No. 2010-164856

SUMMARY OF THE INVENTION

Problems to be Solved by the Invention

However, there are cases in which such an optical module is mounted on a board along with other electronic devices. In these cases, the electronic devices are bonded to the board by reflow soldering. Accordingly, the optical module is required to have heat-resisting property.

However, in the light-path conversion optical coupling device such as the Patent Document 1, the device is made from resin and it is difficult to obtain sufficient heat-resisting property. Specifically, to be used as such an optical component, the transparent resin material is required, but since such transparent resin usually has low heat-resistant property and a large linear expansion coefficient, an optical position displacement and the like may occur.

In the optical module of the Patent Document 2, active alignments are required between the prism (the lenses) and the waveguide as well as between the prism and the optical element. Therefore, the alignments are difficult. It is also difficult to conduct positioning using other parts like guide pins because it is difficult to form holes on a glass-made prism array as mentioned in the Patent Document 1. It is also difficult to make the whole optical module from glass because the shape of the optical module is too complicated.

The present invention has been made in view of such problems. The object of the present invention is to provide a highly heat-resistant optical module which is capable of being bonded by reflow soldering along with other electronic components at the same time, and is easy to conduct optical positioning.

Means for Solving Problems

To achieve the above object, the present invention provides an optical module comprising a circuit board mounting an optical element array thereon; a resin molded body disposed on the circuit board; and a prism/lens array having lenses lined in its width direction, which can reflect light and is glass-made. The resin molded body has a prism-securing part which is provided on a part corresponding to the optical element array and can fix the prism/lens array therein, an opening part provided in the prism-securing part and formed toward an optical connector connected thereto, and a guiding part which conducts positioning of the optical connector. A fitting structure for positioning the prism/lens array in its width direction is formed on a contact surface of the prism/lens array and the prism-securing part, and a front-back direction and a height direction of the prism/lens array is positioned by a contact of the prism/lens array and the prism-securing part.

The fitting structure may comprise convex-shaped lenses on the prism/lens array and bores formed in parts of the prism-securing part corresponding to the convex-shaped lenses, and the bores have a shape corresponding to the convex-shaped lenses and can fit the convex-shaped lenses.

Grooves may be formed in parts of the prism-securing part corresponding to both sides of the lenses for preventing adhesive from entering the lenses.

Preferably, the fitting structure comprises protrusions formed on one of surfaces of the prism/lens array in a direction perpendicular to a lined direction of the lenses, which have approximately V-shaped cross sections, and grooves formed in parts of the prism-securing part corresponding to the protrusions, which can fit the protrusions and have approximately V-shaped cross sections.

Preferably, a pair of the protrusions and a pair of the grooves are formed on both sides of the lenses.

The lenses of the prism/lens array may be formed facing toward the optical element array.

Preferably, the prism/lens array is fixed on at least a bottom surface, side surfaces, and a front surface (however, except light paths of any of these surfaces) of the prism/lens array by adhesive in the prism-securing part.

A lid part is provided on the upper part of the prism/lens array which is placed in the prism-securing part. The lid part is a block having an inclined part corresponding to an inclined surface of the prism/lens array, and the lid part may be disposed such that the inclined part contacts the inclined surface.

A tapered part or a level difference shape that can contact the inclined surface of the prism/lens array is formed on the upper part of the prism-securing part and the prism/lens array may be positioned in its height direction by a contact of the prism/lens array and the tapered part or the level difference shape.

A heat generating element is disposed on the circuit board, a heat releasing part is formed in a part of the resin molded body corresponding to the heat generating element, a heat releasing block is provided in the heat releasing part, and heat generated from the heat generating element may be transmitted to the heat releasing block.

According to the present invention, the prism/lens array is made from glass and the molded body that retains the prism/lens array is made from resin so that the prism/lens array, which is an optical component, is not damaged in reflow soldering process. Also, since the resin molded body is not an optical component, it is not required to be transparent so that highly heat-resistant resin or filler filling resin can be selected.

Also, the positioning of the prism/lens array is possible without using extra components, because the prism/lens array is positioned in its front-back and height directions by a contact of the prism/lens array and the prism-securing part, and in its width direction by a fitting structure between the prism/lens array and the prism-securing part. Therefore, passive alignment can be performed optically and it is easy to align.

Particularly, by forming the tapered part or the level difference shape, which can be in contact with an inclined surface of the prism/lens array, on the upper part of the prism-securing part, the positioning of the prism/lens array in its height direction can be securely conducted.

Also, by providing a fitting structure with the convex-shaped lenses and the bores corresponding to the convex shapes, the shapes of the lenses can be used as a fitting structure for the positioning of the prism/lens array. Therefore, there is no need to process other protrusions and the like on the prism/lens array. Also, in this case, the grooves formed in the parts corresponding to both sides of the lenses prevent adhesive or the like from flowing into the lenses.

Also, if the fitting structure has the V-shaped protrusions formed on one surface of the prism/lens array and V-shaped grooves formed on the prism-securing part, the manufacturability as a glass-made prism/lens array is excellent and the alignment effect is large because the V-shaped protrusions and grooves fit together.

Also, the positioning of the lens part of the prism/lens array can be conducted securely by forming a pair of fitting structure on both sides of the lenses.

Also, if the prism/lens array is fixed on the bottom surface, the sides, and the front surface having lenses of the prism/lens array by adhesive in the prism-securing part, the prism/lens array has at least four bonded surfaces and the prism/lens array can be securely fixed in the prism-securing part.

Also, by using the lid part which has an inclined part that corresponds to the inclined surface of the prism/lens array and placing the lid part on the prism/lens array, the prism/lens array is pushed toward the front and the bottom surfaces so that the positioning can be conducted securely and the prism/lens array is protected from foreign bodies.

Also, by forming the lenses facing toward the optical element, the thickness of the lower surface of the prism-securing part can be increased.

Also, the heat generating element is disposed on the circuit board and the heat releasing block is provided on a part of the resin molded body which corresponds to the heat generating element. If the heat from the heat generating element can be transmitted to the heat releasing block, the heat from the heat generating element on the circuit board can be released toward the upper surface side of the resin molded body. Therefore, in an optical module package, in which a pair of optical modules is built in such that the optical modules face to each other, the heat can be released out of the package without accumulating between the circuit boards.

Effects of the Invention

According to the present invention, a highly heat-resistant optical module which is capable of being bonded by reflow soldering along with other electronic components at the same time and is easy to conduct optical positioning can be provided.

BRIEF DESCRIPTION OF THE DRAWINGS

FIG. 1(a) and FIG. 1(b) illustrate an optical module package 1 in which FIG. 1(a) is an assembled perspective view and FIG. 1(b) is an exploded perspective view.

FIG. 7(a) and FIG. 7(b) are cross-sectional views of the prism/lens array 25 being placed in the prism-securing part 19 in which FIG. 7(a) is a cross-sectional view of D-D line in FIG. 5 and FIG. 7(b) is a cross-sectional view of E-E line in FIG. 5.

FIG. 10(a), FIG. 10(b), and FIG. 10(c) illustrate a fitting structure 20a.

DETAILED DESCRIPTION OF THE PREFERRED EMBODIMENTS

Figure 1:
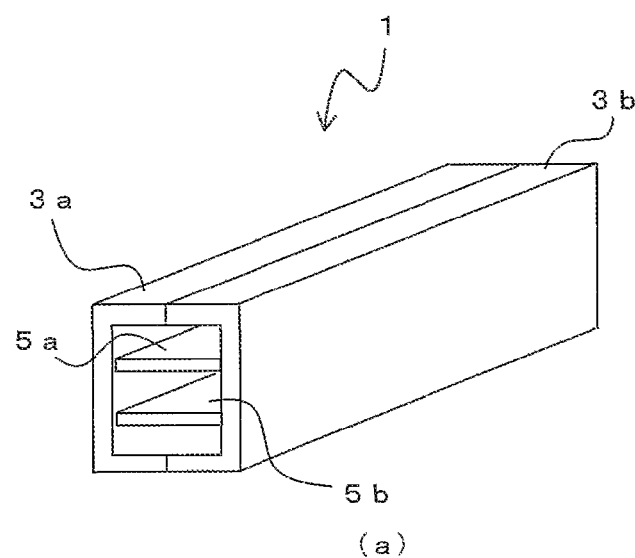
Figure 1:
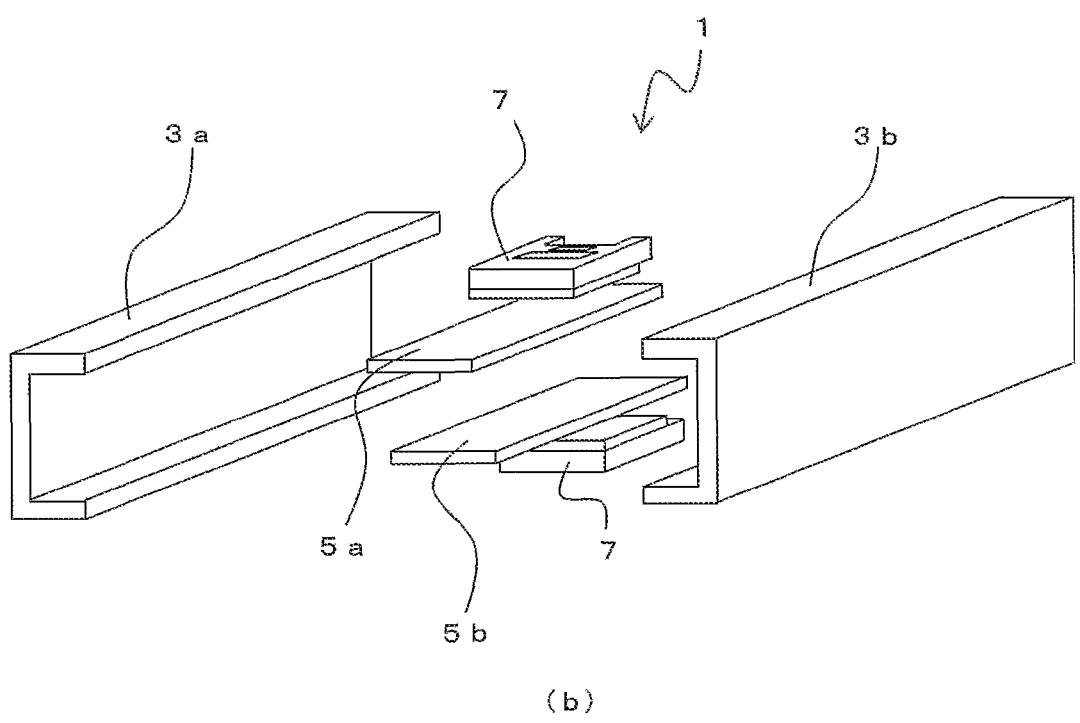

Hereinafter, the embodiments of the present invention will be described with reference to the drawings. FIG. 1(a) and FIG. 1(b) illustrate an optical module package. FIG. 1(a) is an assembled perspective view and FIG. 1(b) is an exploded perspective view. Connectors and cables and the like connected to the optical module package 1 are omitted in FIG. 1.

The optical module package 1 includes a pair of printed boards 5a and 5b and a pair of optical modules 7, both of which are placed in cases 3a and 3b. Each of the optical modules 7 is connected to the printed boards 5a and 5b respectively. For example, a pair of the printed board 5a, 5b and the optical modules 7 is a light receiving side and a light emitting side.

Optical cables and the like are connected to the optical modules 7 via a connector not shown in the drawings. The optical modules 7, for example, convert light from the optical cable to electricity. The optical modules 7 are electrically connected to the printed boards 5a, 5b.

The printed boards 5a, 5b are placed in the cases 3a, 3b so that the inner surfaces of the printed boards are facing each other. Each of the optical modules 7 is placed on each of the outer surfaces of the circuit boards. Therefore, to release heat generated in the optical modules 7, heat releasing bores not shown may be formed at predetermined positions.

In a standardized small package, only a very narrow space is allowed as a gap between the inner surfaces of cases 3a, 3b and the surfaces of the printed boards 5a, 5b. Therefore, to be placed in this gap, the optical modules 7 are required to be small and thin.

Figure 2:
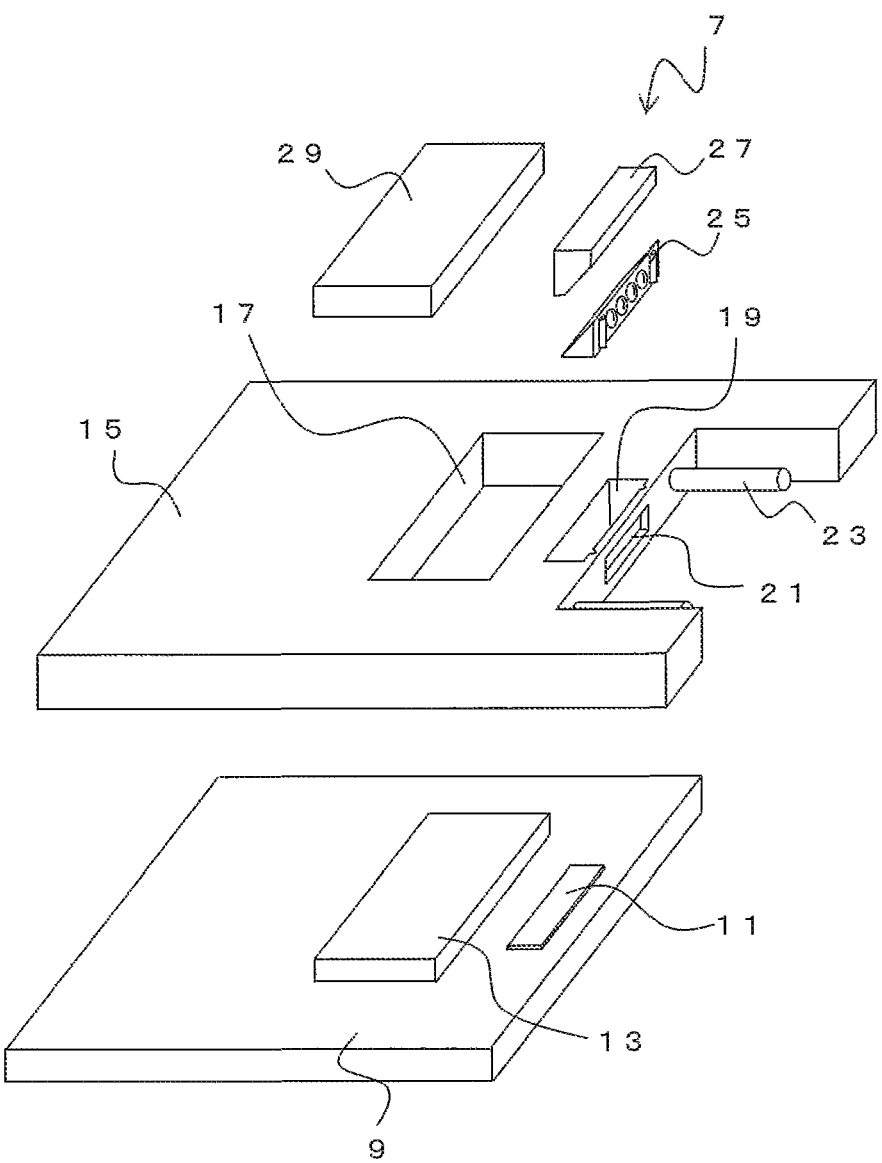
FIG. 2 is an exploded perspective view of an optical module 7.
Figure 3:
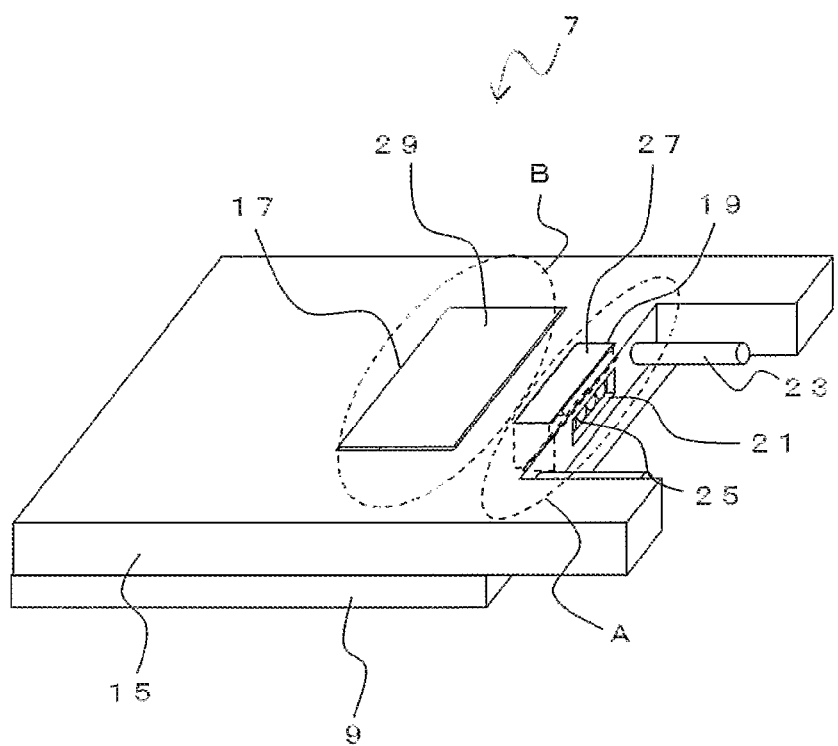
FIG. 3 is an assembled perspective view of the optical module 7.

Next, the structure of the optical module 7 will be described. FIG. 2 is an exploded perspective view and FIG. 3 is an assembled perspective view of the optical module 7. The optical module 7 are mainly composed of a circuit board 9, a resin molded body 15, a prism/lens array 25, a lid part 27, a heat releasing block 29 and the like.

The circuit board 9 is electrically connected to the printed boards 5a, 5b. On the circuit board 9, an optical element array 11, a heat generating element 13, and the like are disposed. A semiconductor laser such as Vertical Cavity Surface Emitting Laser (VCSEL), photodiode array, and the like are applied as the optical element 11. The optical element 11 serves as a light emitting part or a light receiving part.

The heat generating element 13 is an electronic component such as an IC chip and the like. Photoelectric conversion is conducted in the circuit board 9. Other electronic components such as capacitors not shown are disposed on the circuit board 9 appropriately. Ceramics or an FR4 substrate and the like having a heat-resisting property may be used for the circuit board 9.

The resin molded body 15 is a component made from resin and is bonded to the circuit board 9 by using a highly heat-resistant adhesive such as an epoxy resin including silica filler. Preferably, the resin molded body 15 is a filler filled resin molded body having a high heat-resisting property and a low linear expansion coefficient. For example, materials such as molding materials for general MT connectors, an epoxy resin with heat-resistant silica filler, or phenol resin may be used for the resin molded body 15. It is also preferable to form the resin molded body 15 by using a high precision resin molding technique with a high accuracy in dimension.

A prism-securing part 19 is formed on a part of the resin molded body 15 corresponding to the optical element array 11. A part of the prism-securing part 19 is a bore which penetrates both surfaces of the resin molded body 15. The prism/lens array 25 is inserted and fixed into the prism-securing part 19. The prism/lens array is a glass made component having a plurality of lenses provided side by side and is made by a high-precision glass forming technique.

The linear expansion coefficient of the resin composing the resin molded body 15 should be equal to or more than that of the glass composing the prism/lens array 25. The further details of the prism/lens array 25 and how to fix the prism/lens array 25 into the prism-securing part 19 will be described later.

An opening part 21 is provided on the side where the above-mentioned connectors are connected (i.e. the side on which guiding pins 23 are formed) when the prism/lens array 25 is fixed in the prism-securing part 19. Therefore, the parts of the prism/lens array 25 (parts of lenses) are exposed at the edge surface of the resin molded body 15 through the opening part 21 which serves as a light path.

For example, light emitted from the optical element 11 enters the prism/lens array 25 through the penetrating bore at the bottom surface of the prism-securing part 19, changes its direction 90 degrees at the prism/lens array 25, and then exits from the opening part 21 to the connector which is a connection target. If the light enters from the connector side, the direction of the light path is reversed.

A lid part 27 is provided on the upper part of the prism/lens array 25 covering the prism/lens array 25. The lid part 27 protects the prism/lens array 25 from scratches and dirt caused by adhesion of foreign objects.

A heat releasing part 17 is formed on a part of the resin molded body 15 corresponding to the heat generating element 13. The heat releasing part 17 is a bore penetrating both surfaces of the resin molded body 15. A heat releasing block 29 is inserted and fixed into the heat releasing part 17. The heat releasing block 29 is made from a material having a high heat-conductivity, such as copper or aluminum. The heat releasing block 29 receives heat generated by the heat generating element 13 and releases the heat toward the upper side of the optical module 7 (the side opposite to the one connected to the printed board). Therefore, when an optical module package is used, the generated heat can be released out of the package by means of the heat releasing block 29.

An edge part of the resin molded body 15 is a connecting part for other connectors which are omitted in the drawings. A pair of guiding pins 23 is formed at the connector part in the direction of insertion/extraction of the connecting target connectors. The guiding pins 23 are inserted and fixed in bores formed on the resin molded body 15. The guiding pins 23 can conduct positioning of the connectors and the optical module 7.

Figure 4:
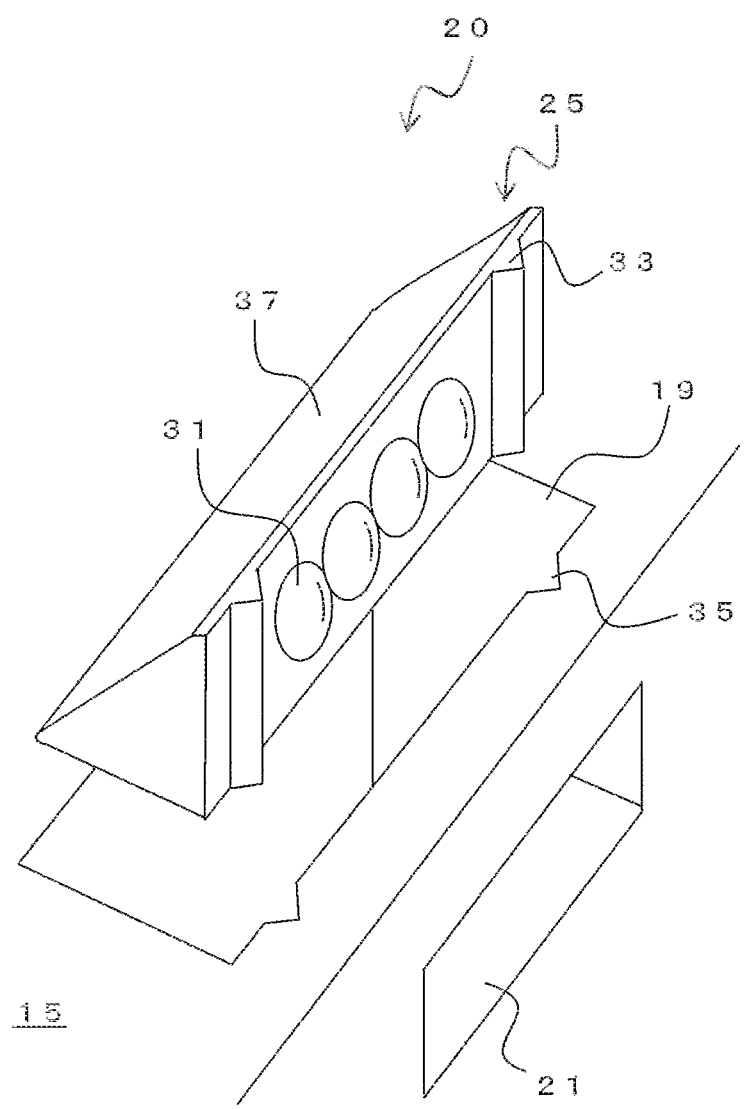
FIG. 4 is an enlarged view showing a vicinity of a prism/lens array 25 and a prism-securing part 19.

Next, the structure of the prism/lens array 2 and the method for fixing the same will be described. FIG. 4 illustrates a fitting structure 20 and is an enlarged perspective view showing a vicinity of the prism/lens array 25 and the prism-securing part 19. The prism/lens array 25 is a glass-made prism having an approximately 45 degrees tapered part. A plurality of lenses 31 are lined on the front surface of the prism/lens array 25 (the surface which faces the opening part 21 when fixed). The number of lenses 31 is not limited to what is shown in the drawing.

The forming region of the lenses 31 is slightly smaller than the hollow opening part 21 so that all of the lenses 31 are exposed through the opening part 21 when the prism/lens array 25 is placed in the prism securing part 19. The width of the opening part 21 is narrower than the width of the prism/lens array 25. Therefore, both side parts of the prism/lens array 25 extend beyond the opening part 21 on both sides and can be in contact with inner surfaces of the prism-securing part 19.

On the lined surface of the lenses 31, a pair of protrusions 33 is formed on both sides of the lenses 31. The protrusions 33 have approximately V-shaped cross-sections and are formed in the top-bottom direction (the direction which is perpendicular to the direction in which the lenses 31 are lined). The protrusions 33 may be formed not necessarily along the whole height of the prism/lens array 25, but in some part along the top-bottom direction.

Grooves 35 are provided in parts of the inner surface of the prism-securing part 19 that corresponds to the protrusions 33. The grooves 35 are shaped such that the protrusions 33 can fit in the grooves. For example, the grooves can be approximately V-shaped grooves. Grooves 35 are formed downwardly from the upper edge along the inserting direction of the prism/lens array 25.

Figure 5:
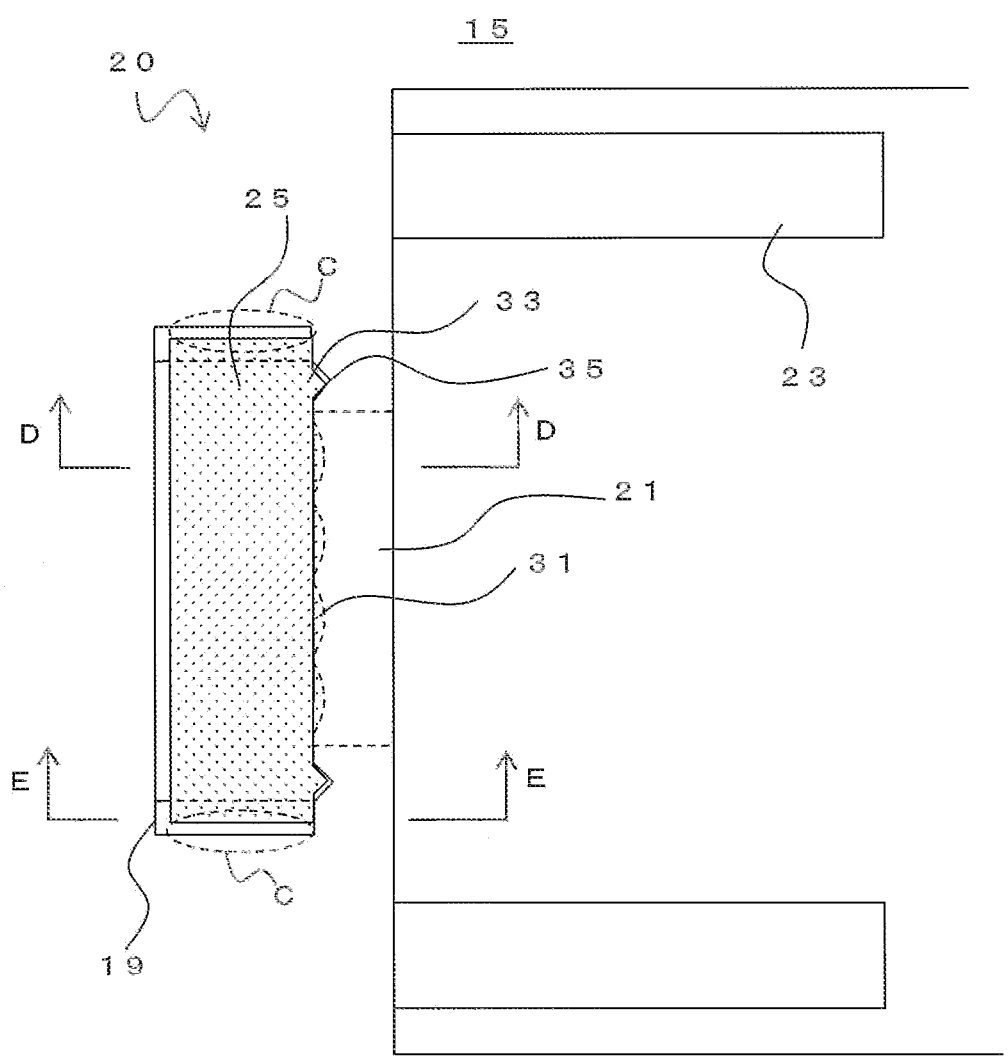
FIG. 5 is a plan view of the prism/lens array 25 being placed in the prism-securing-part 19.
Figure 6:
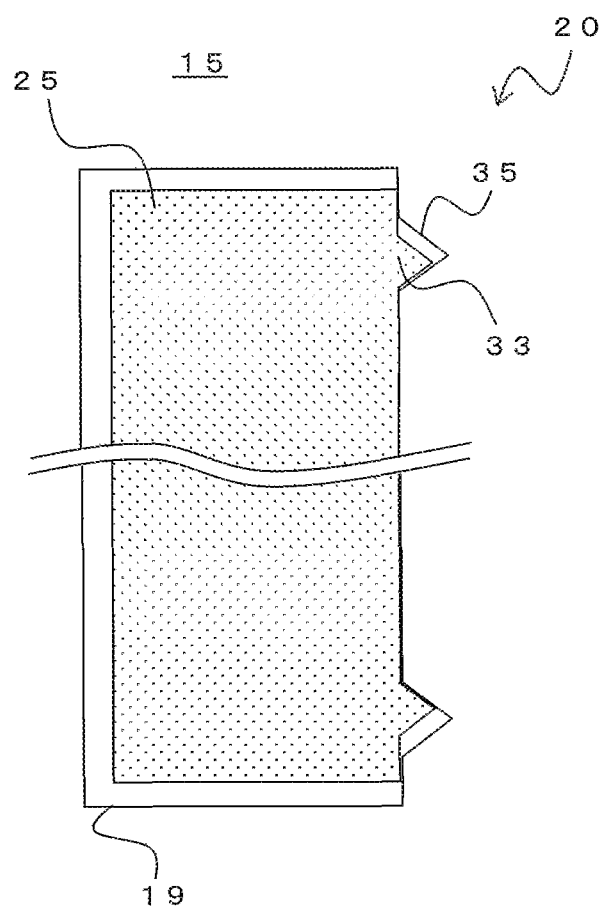
FIG. 6 is an enlarged view showing a vicinity of protrusions 33 and grooves 35 with the prism/lens array 25 being placed in the prism-securing-part 19.

FIG. 5 is a plan view showing the prism/lens array 25 inserted in the prism-securing part 19 and is an enlarged view of section A in FIG. 3. FIG. 6 is an enlarged view of the fitting structure of the protrusions 33 and the grooves 35. The protrusions 33 of the prism/lens array 25 fit the grooves 35. Here, as shown in FIG. 6, the opening width of the grooves 35 is larger, for example, approximately 5 μm, than the skirt width of the protrusions 33. The grooves 35 are formed such that the centers of the grooves 35 are shifted outwardly from the centers of the protrusions 33 in the width direction. Therefore, play of the protrusions 33 in the grooves 35 can be small when the pair of protrusions 33 is fitted in the pair of the grooves 35. Also, since the grooves 35 can be shaped approximately similar to the V-shape of the protrusions 33, it is easy to process the grooves 35 slightly larger than the protrusions 33. Therefore, whole of the protrusions 33 can be fitted in the grooves 35. Therefore, the front surface of the prism/lens array 25, parts except protrusions 33 and parts except the opening part 21, can be in surface contact with the facing surface of the prism-securing part 19 (the surface on which the grooves 35 are formed).

In this way, the positioning of the lenses in the direction in which the lenses are formed can be securely conducted keeping an angle between the direction in which the guiding pins 23 are formed and the direction in which the lenses 31 are lined at 90 degrees. In other words, the protrusions 33 and the grooves 35 function as a fitting structure to conduct a positioning of the prism/lens array in its width direction. The cross-sectional shapes of the protrusions 33 and the grooves 35 are not limited to the V-shapes shown in the drawings and may be any other shapes. Also, the positions for forming the protrusions and grooves can be reversed.

The width of the prism-securing part 19 is wider than the width of the prism/lens array 25. Therefore, there are gaps between both side parts of the prism/lens array 25 and the side walls of the prism-securing part 19 (shown as part C in the drawing). The gaps are filled with the adhesive. Because the gaps are formed, pool parts for the adhesive can be provided and the prism/lens array 25 does not receive a large stress from the side walls of the prism-securing part 19 in case of a temperature change.

Figure 7:
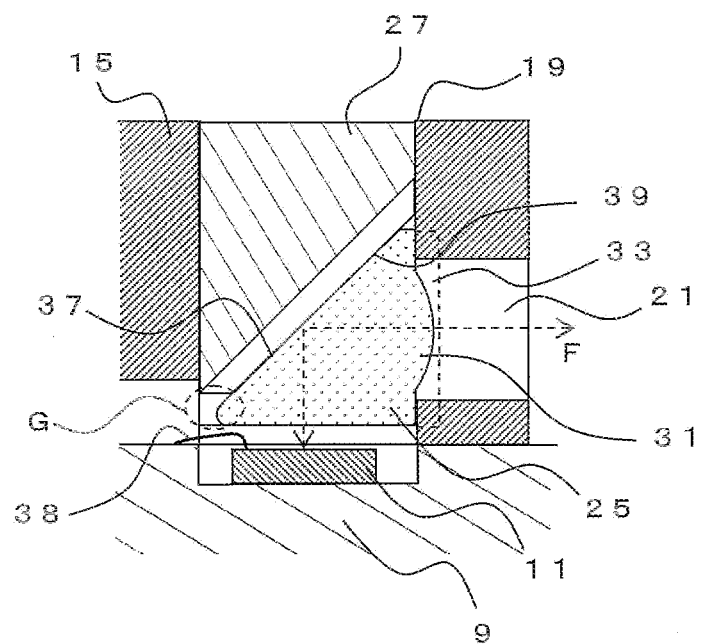
Figure 7:
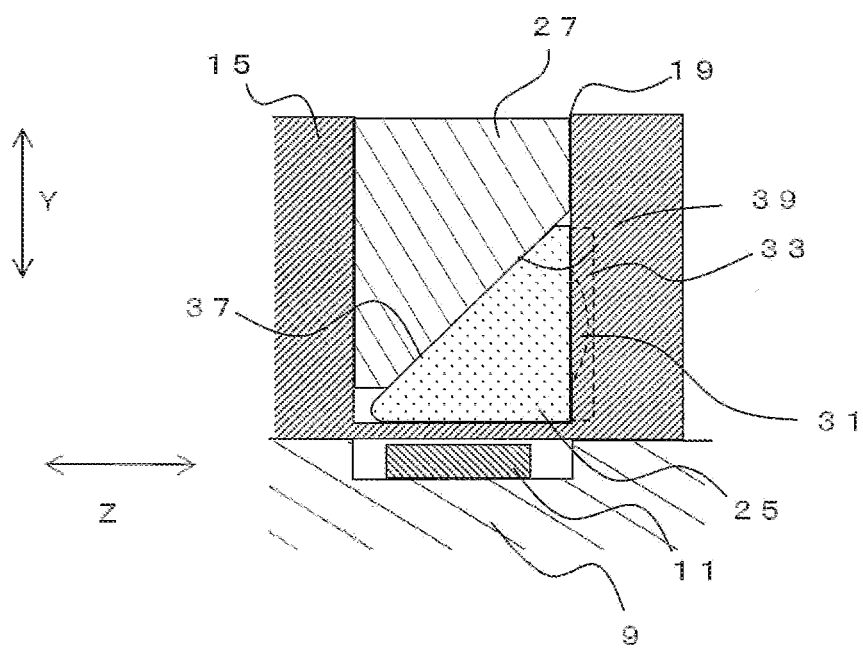

FIG. 7(a) is a cross-sectional view of D-D line in FIG. 5 and FIG. 7(b) is a cross-sectional view of E-E line in FIG. 5, showing the lid part 27 being installed. As shown in FIG. 7(a), whole of the lenses 31 exposes through the opening part 21 since the opening part 21 is larger than a region on which the convex parts of the lenses 31 are formed. A bore is formed at the bottom part of the prism-securing part 19, which corresponds to the parts of the lenses 31. Therefore, light from the optical element 11 is introduced to the prism/lens array 25 through the bore, reflected inside the prism/lens array 25, and then emitted to the connecting target connectors from the opening part 21 via the lenses 31 (shown as arrow F in the drawing). That is, the optical element 11, the prism/lens array 25 (the part corresponding to the lenses 31 in its width direction), and the opening part 21 form a light path. The optical element 11 is connected to the circuit board 9 with a wire 38.

As shown in FIG. 7(b), the bottom surface of the prism-securing part 9 is not penetrated at both side parts of the lenses 31 and is a contacting surface with the bottom surface of the prism/lens array 25. This enables to conduct a positioning of the prism/lens array 25 in its height direction (the direction perpendicular to the direction in which the lenses 31 are lined and shown as Y direction in the drawing) with a bottom surface of the prism/lens array 25 (the surface which is perpendicular to the front surface on which the lenses 31 are formed) being in surface contact with the bottom surface of the prism-securing part 19.

Except the light path, the prism/lens array 25 and the prism-securing part 21 are bonded at the front surface (the lined surface of the lenses 31), the bottom surface, and the side surfaces of the prism/lens array 25 respectively with adhesive. To bond the front surface and the bottom surface of the prism/lens array to the prism-securing part 19, adhesive such as epoxy resin, which has a high heat-resisting property, can be used.

To bond the side surfaces of the prism/lens array to the prism-securing part 19, a high-viscosity adhesive such as epoxy resin with a high heat-resisting property containing silica filler can be used. Also, heat-curable adhesive can also be used. In this case, if the curing temperature is 100° C. or more, the prism/lens array 25 receives compressive stress from the resin molded body 15 (the prism-securing part 19) with the environmental temperature of 100° C. or below. On the other hand, by using an adhesive having linear expansion coefficient which is more than that of the resin molded body, the load onto the lenses can be reduced and the lenses can be prevented from disengaging easily since compressive stress on the lenses can be eased.

The lid part 27 covers the upper part of the prism/lens array 25. The lid part 27 has a tapered part 39 which corresponds to a tapered part 37 on the back surface of the prism/lens array 25. That is, the tapered part 37 can contact the tapered part 39 by covering the upper part of the prism/lens array 25 with the lid part 27.

Generally, the prism/lens array 25 is pulled toward the front surface side and the bottom surface side by means of the above-mentioned surface tension of the adhesive. This enables the front surface and the bottom surface of the prism/lens array 25 to be securely in surface contact with the inner surfaces of the prism-securing part 19. However, by using the lid part 27, the prism/lens array 25 is slightly pushed to the front and bottom surface sides and the sides can be more securely in surface contact with the inner surfaces of the prism-securing part 19. In this way, by making the front surface of the prism/lens array 25 contact with the inner surface of the prism-securing part 19, positioning of the prism/lens array 25 in its front-back direction (the lined direction of the lenses 31 which is shown as an arrow Z in the drawing) can be conducted. The shape of the lid part 27 is not limited to what is shown in the drawings and may be a plate-like member as long as it provides a dust preventing effect for the prism/lens array 25.

A cut out is formed at the rear corner of the prism/lens array (at the intersection of the bottom surface of the prism/lens array 25 and tapered part 37 in the cross-section). Also, the opening width to which the prism-securing part 19 corresponds is larger than the thickness of the prism/lens array (the distance from the lens surface to the rear edge). Therefore, a gap (shown as G part in the drawing) is formed at the rear of the prism/lens array 25 when it is placed in the prism-securing part 19.

By forming the cut out at the corner of the prism/lens array 25 and forming the gap when the array is placed, a pool part for the adhesive can be provided. This prevents the adhesive from spreading out to the light path and the like unintentionally.

Figure 8:
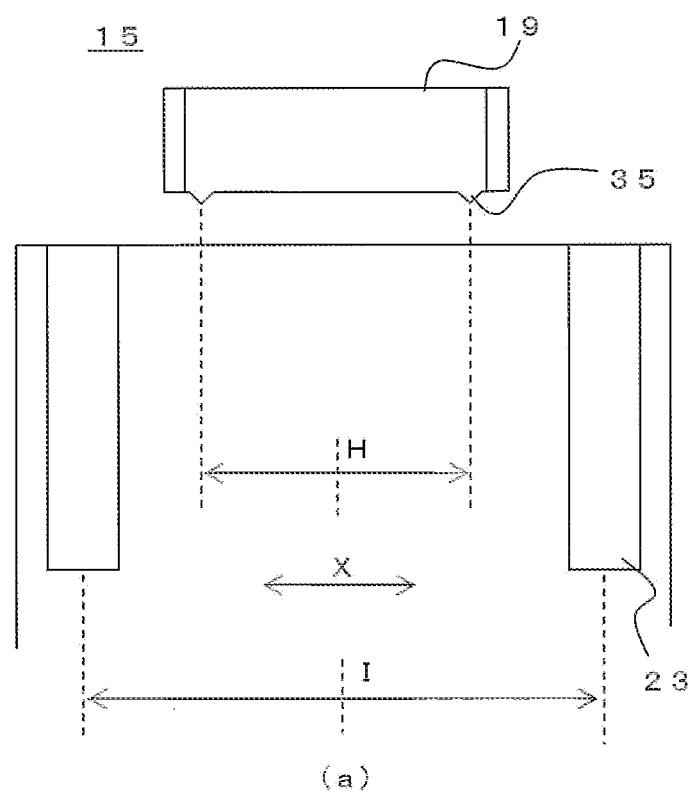
FIG. 8(a) and FIG. 8(b) show a positional relationship of each component.
Figure 8:
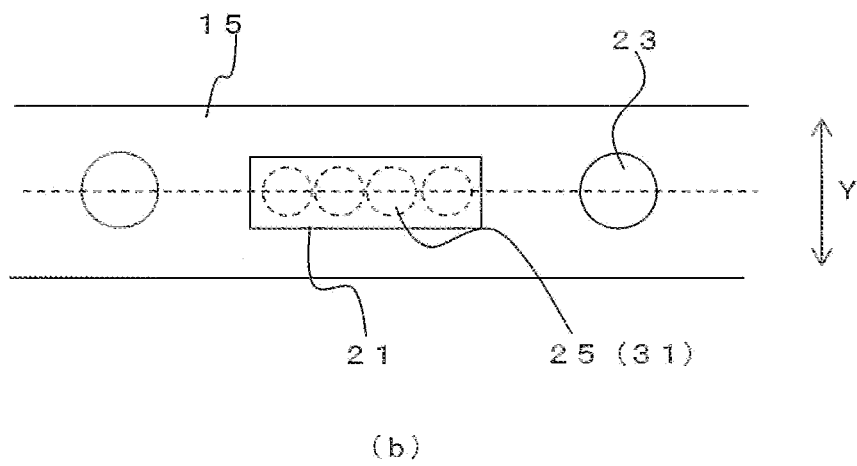

FIG. 8(*a*) is a plan view of a vicinity of the prism-securing part 19. The positions of the lenses 31 on the prism/lens array 25 in their width direction (the direction X in the drawing and the direction in which the lenses 31 are lined) is set based on the guiding pins 23. In other words, the middle point between each shaft center of the guiding pins 23 (shown as I part in the drawing) is a basis point for the positioning of the lenses 31.

The misalignment between the basis point and the middle point of the each center of the grooves 35 (shown as H in the drawing) is set to be not more than +/−5 µm. That is, the accuracy of the position of the lenses 31 in their width direction (the direction X) is +/−5 µm or less. The dispersion of each of the lenses 31 in their width direction is set to be not more than +/−2 µm.

FIG. 8(*b*) is a front view of a vicinity of the prism-securing part 19 viewed from the side of the opening part 21. The position of the lenses 31 on the prism/lens array 25 in their height direction (the direction Y in the drawing which is perpendicular to the direction in which the lenses 31 are lined) is set based on the guiding pins 23. That is, the line connecting both shaft centers of the guiding pins 23 is a basisline.

The misalignment between this basis line and the lenses 31 is set to be not more than +/−3 µm. That is, the accuracy of the position of the lenses 31 in their height direction (the direction Y) is +/−3 µm or less. The dispersion of each of the lenses 31 in their height direction is set to be not more than +/−2 µm.

Figure 9:
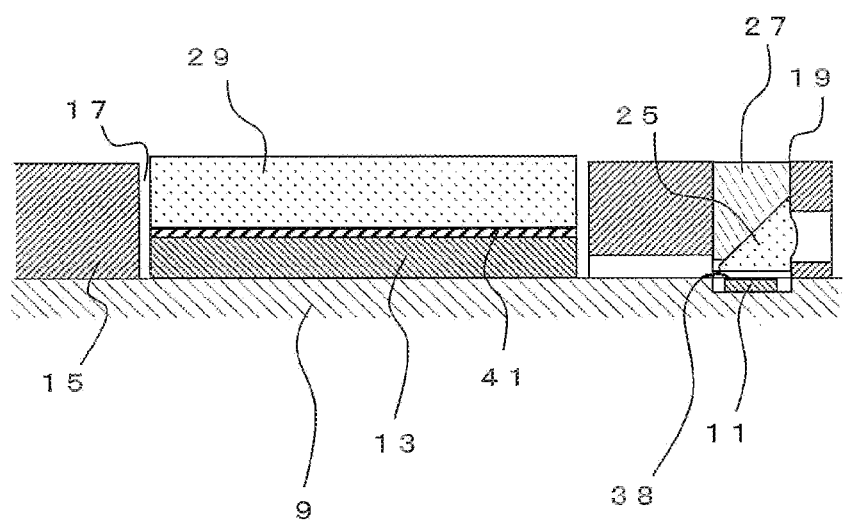
FIG. 9 is an enlarged cross-sectional view showing a vicinity of a heat releasing part 17.

Next, the heat releasing part will be described. FIG. 9 is a cross-sectional view of a vicinity of the heat releasing part 17 and is an enlarged cross-sectional view of a vicinity of section B in FIG. 3. The heat releasing part 17 is placed above the heat generating element 13 as described above. The heat releasing block 29 is bonded on the heat generating element 13 via a heat releasing resin 41. The heat releasing resin 41 is a highly heat-conductive adhesive such as a rubber member having a tensile strength of not more than 10 MP. In this way, a rise of temperature inside the optical module caused by the heat from the heat generating element 13 can be suppressed.

According to the present invention as described above, the optical module that has high heat-resisting property and excellent optical characteristics can be obtained by forming the prism/lens array 25 and the resin molded body 15 separately and placing the prism/lens array 25 in the resin molded body 15, so that mechanical load required for the optical connectors is received by the resin molded body having excellent toughness.

Also, by making the prism/lens array 25 from glass and composing the resin molded body 15, which does not form the light path, of heat-resisting resin, the optical module can be put into a reflow for commonly-used low-temperature soldering (for example, SnAgCu solder having a melting point of 220° C. and the like), so that a simultaneous substrate implementation with other electronic devices is possible. This enables an inexpensive high-density implementation of the optical module.

Also, by composing an optical system with the glass-made prism/lens array 25, the optical module can be small and thin and, at the same time, can serve as an optical connector and can obtain good optical characteristics with the optical element. Also, by forming V-shaped protrusions on both sides of the prism/lens array 25 as a fitting structure, the positioning can be conducted with high accuracy.

Also, when the accuracy of the positioning of the prism/lens array 25 and the resin molded body is +/−5 µm on the guiding pin basis and the accuracy of the center positions of each of the lenses 31 is +/−2 µm, a tolerance-width of misalignment for the optical coupling loss 3 dB of the optical element and GI50/125-MMF can be 30 µm or more.

Also, since at least four surfaces, front, bottom, and both sides of the prism/lens array 25 can be bonded with the adhesive, the prism/lens array 25 can be retained more securely.

Also, by providing the lid part 27, the prism/lens array, which is an optical system, can be protected from dust. Also, by forming a tapered part on the lid part 27 to be in contact with a tapered part of the prism/lens array 25, the prism/lens array 25 can be positioned and retained more securely.

Also by securely contacting the bottom surface of the prism/lens array 25 with the bottom surface of the prism-securing part 19, the position of the prism/lens array 25 in its top-bottom direction can be restricted. Also, by securely contacting the front surface of the prism/lens array 25 with the front surface of the prism-securing part 19, the position of the prism/lens array 25 in its front-back direction can be restricted. Also, by securely fitting the protrusions 33 of the prism/lens array 25 to the grooves 35 of the prism-securing part 19, the position of the prism/lens array 25 in its width direction is restricted.

Since the total thickness of the optical module can be thinner, for example, 2 mm or less, the optical module in the present invention can be implemented if there is a space to the extent of a commonly-used circuit board. Also, since the resin molded body 15 has an optical connecting function, an optical connection with optical cables can be achieved with workability similar to that of a commonly-used MT connector. Similarly, the active alignment can be easily conducted since handling the resin molded body 15 is possible after the prism/lens array is fixed.

Although the embodiment of the present invention has been described referring to the attached drawings, the technical scope of the present invention is not limited to the embodiment described above. It is obvious that persons skilled in the art can think out various examples of changes or modifications within the scope of the technical idea disclosed in the claims, and it will be understood that they naturally belong to the technical scope of the present invention.

Figure 10:
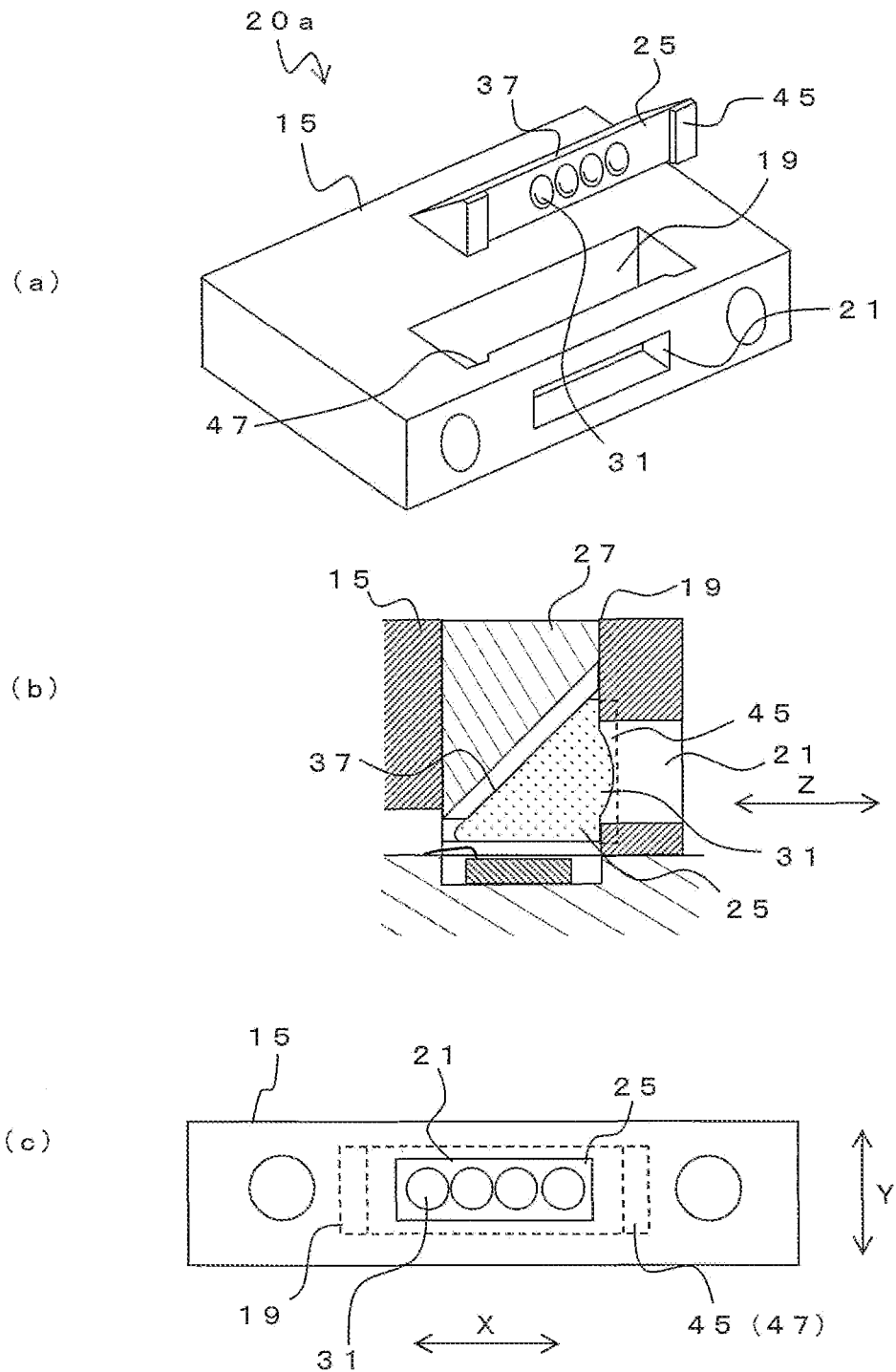

For example, the fitting structure may be a fitting structure 20*a* shown in FIG. 10. FIG. 10 shows the fitting structure 20*a*. Hereinafter, the guiding pins and the like will be omitted in the drawings and the resin molded body 15 will be shown in simplified manner. Also, in the descriptions hereinafter, same numerals as in FIG. 2 to FIG. 8 will be used for the components that have similar functions as in the fitting structure 20 and redundant descriptions will be omitted.

In the fitting structure 20*a*, the shape of the protrusions is different from the fitting structure 20. Convex parts 45 that have approximately rectangular-shaped cross-sections are formed on the front surface of the prism/lens array 25 on both sides of the lenses 31. Concave parts 47 are formed in corresponding parts of the prism-securing part 19. The convex parts 45 and the concave parts 47 can be fitted together. Therefore, by fitting the convex parts 45 and concave parts 47, the positioning of the prism/lens array 25 in its width direction can be conducted.

Figure 11:
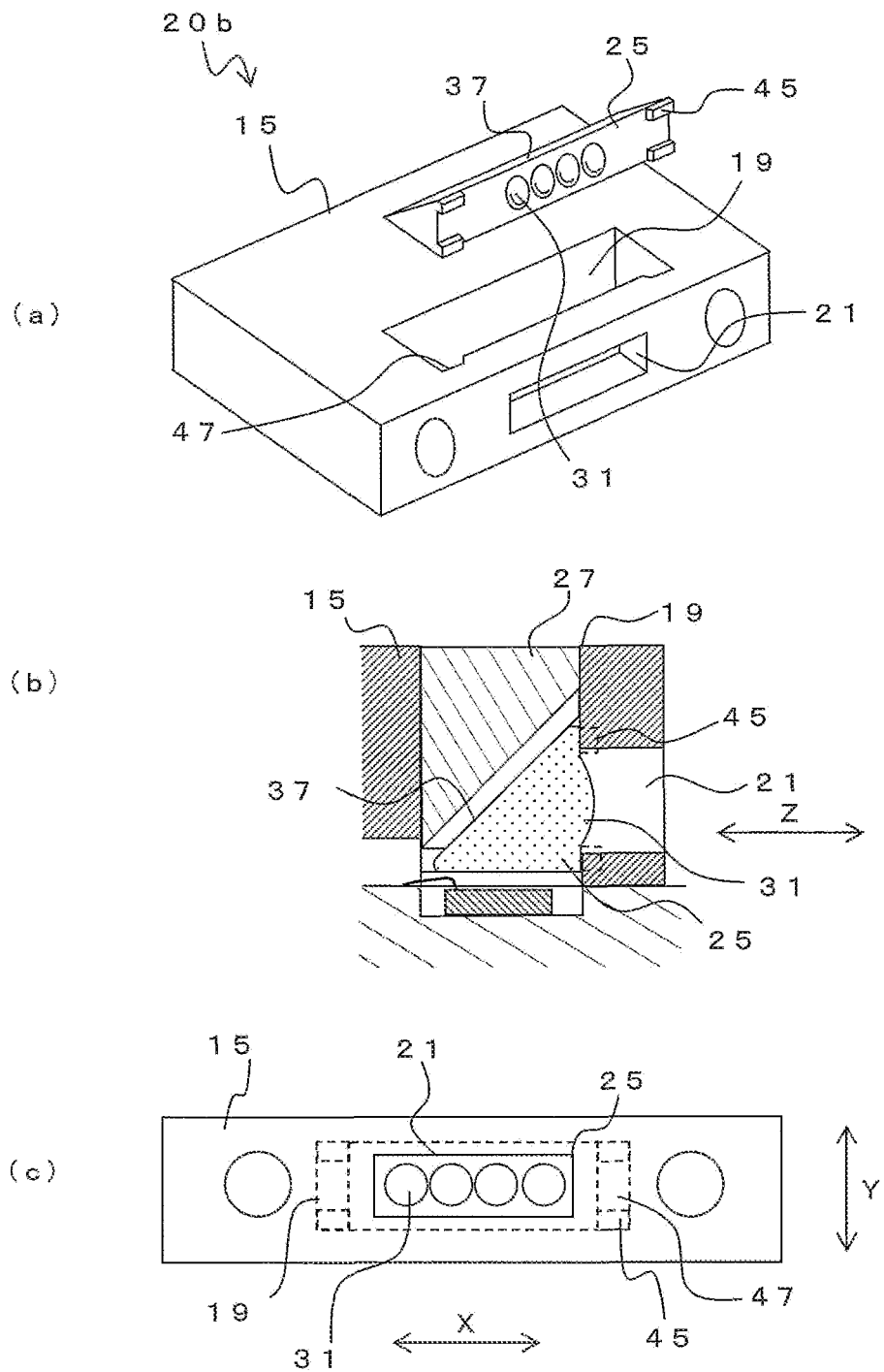
FIG. 11(a), FIG. 11(b), and FIG. 11(c) illustrate a fitting structure 20b.

Also, the fitting structure may be a fitting structure 20*b* as shown in FIG. 11. In the fitting structure 20*b*, the shape of the protrusions is further different from the fitting structure 20*a*. Convex parts 45 that have approximately rectangular-shaped cross-sections are formed separately on an upper part and a lower part of the front surface of the prism/lens array 25 on both sides of the lenses 31. Concave parts 47 are formed in corresponding parts of the prism-securing part 19. The convex parts 45 and the concave parts 47 can be fitted. That is, by fitting the convex parts 45 and the concave parts 47, the positioning of the prism/lens array 25 in its width direction can be conducted.

Figure 12:
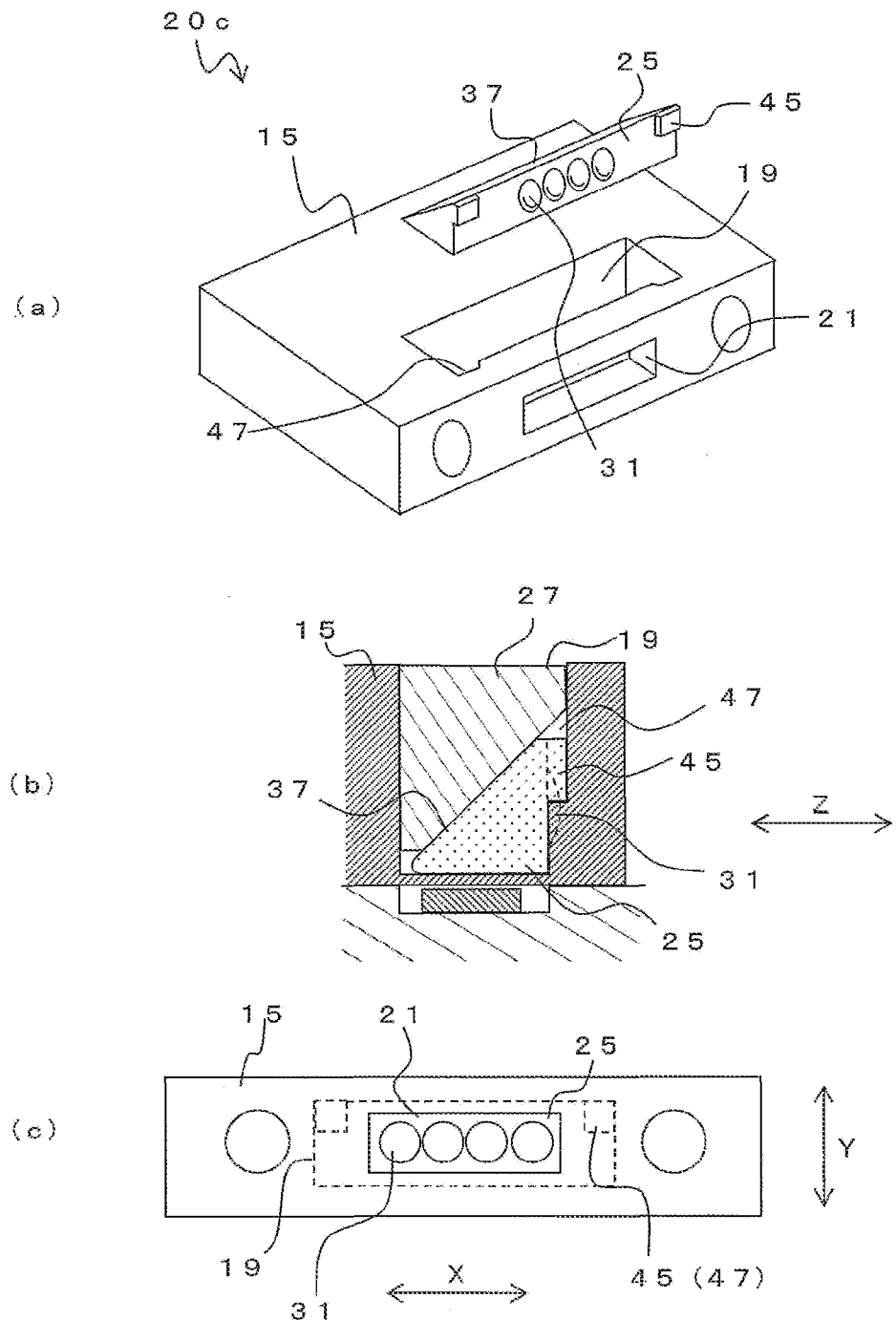
FIG. 12(a), FIG. 12(b), and FIG. 12(c) illustrate a fitting structure 20c.

Also, the fitting structure may be a fitting structure 20c as shown in FIG. 12. In the fitting structure 20c, the shape of the protrusions is further different from the fitting structure 20b. Convex parts 45 that have approximately rectangular-shaped cross-sections are formed on an upper part of the front surface of the prism/lens array 25 on both sides of the lenses 31. Concave parts 47 are formed in corresponding parts of the prism-securing part 19. The concave parts 47 may be formed from the top to the predetermined height. The convex parts 45 and the concave parts 47 can be fitted together. That is, by fitting the convex parts 45 and the concave parts 47, the positioning of the prism/lens array 25 in its width direction can be conducted.

Figure 13:
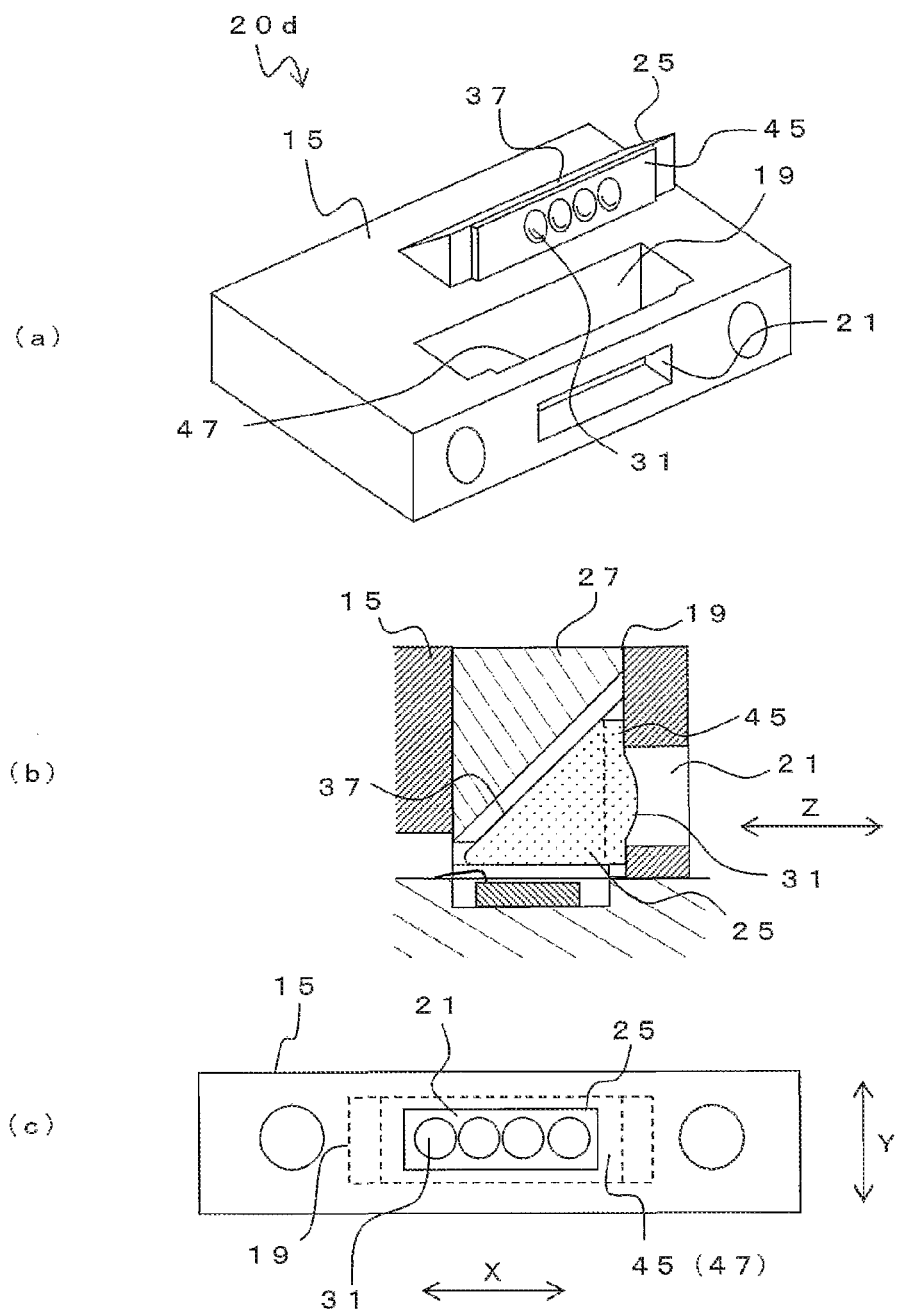
FIG. 13(a), FIG. 13(b), and FIG. 13(c) illustrate a fitting structure 20d.

Also, the fitting structure may be a fitting structure 20d as shown in FIG. 13. In the fitting structures 20d, the shape of the convex parts is different from the fitting structures 20a and the like. The whole region on which the lenses 31 are formed becomes a convex part 45. A concave part 47 is formed in a corresponding part of the prism-securing part 19. The convex part 45 and the concave part 47 can be fitted together. That is, by fitting the convex part 45 and the concave part 47, the positioning of the prism/lens array 25 in its width direction can be conducted.

As described above, same effects as in the fitting structure 20 can be obtained in the fitting structures 20a to 20d. That is, the positioning of the prism/lens array 25 in three directions (directions X, Y, and Z in the respective drawings) can be conducted.

Although the protrusions 33 and the grooves 35, or the convex parts 45 and the concave parts 47, are formed on the front surface side of the prism/lens array 25 (the surface on which the lenses are lined) to conduct the positioning in its width direction, they may be formed on the bottom surface side of the prism-securing part 19.

Figure 14:
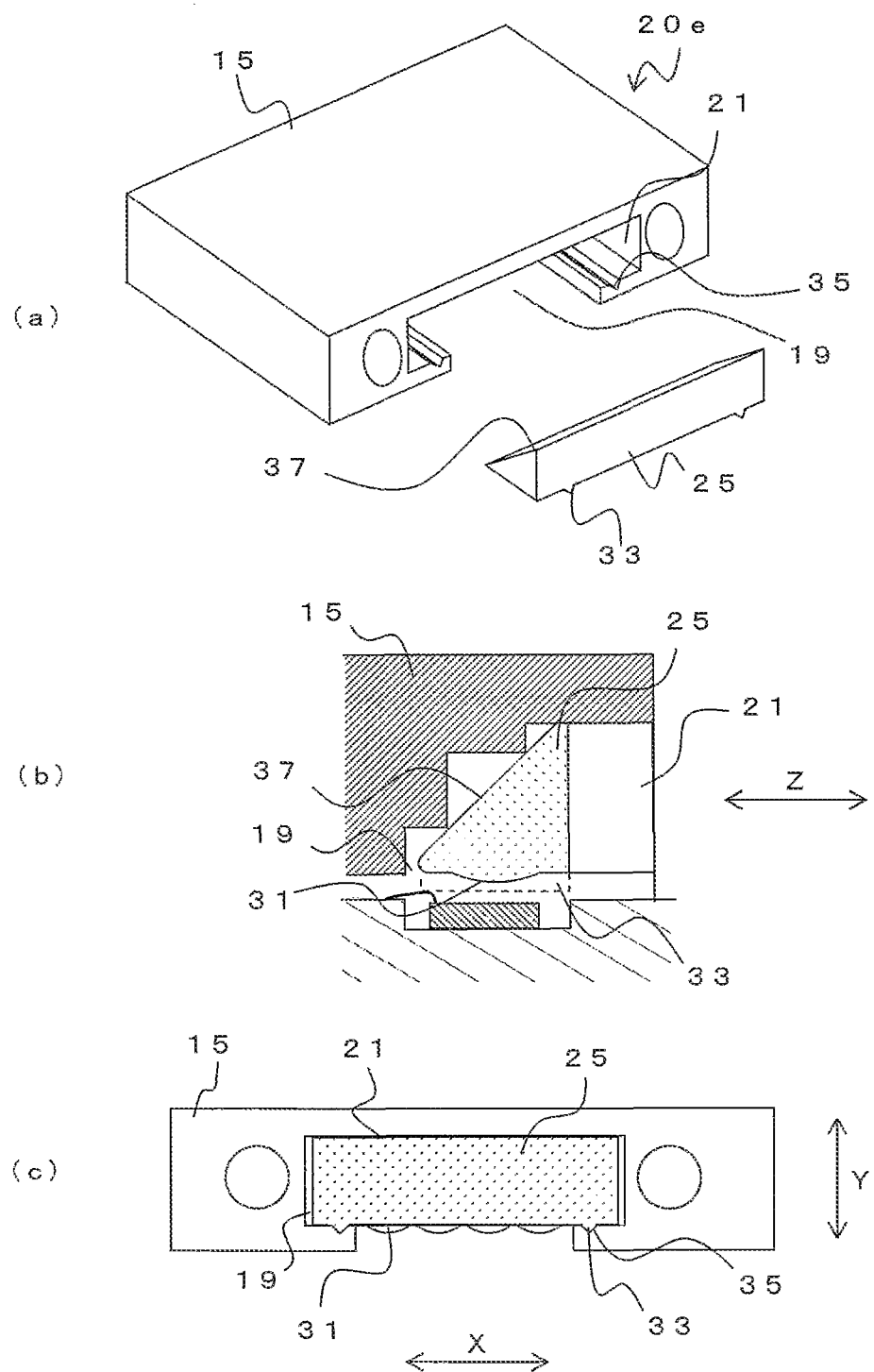
FIG. 14(a), FIG. 14(b), and FIG. 14(c) illustrate a fitting structure 20e.

FIG. 14 shows a fitting structure 20e having protrusions 33 formed on a lower part. In the fitting structure 20e, the prism/lens array 25 is inserted from the front part of the resin molded body 15. That is, the opening part 21 is formed corresponding to the size of the prism/lens array 25. The prism-securing part 19 has a shape in which both side parts project toward the center. The lenses 31 are formed on the lower surface of the prism/lens array 25. That is, the lenses 31 are disposed facing toward the optical element side.

The protrusions 33 are formed on the lower surface of the prism/lens array 25 along its front-back direction. Also, the grooves 35 are formed on upper surfaces of the projecting parts of the prism-securing part 19. The protrusions 33 and the grooves 35 fit together when the prism/lens array 25 is inserted in the prism-securing part 19. Therefore, the positioning of the prism/lens array 25 in its width direction (the direction X in the drawing) is conducted.

The tapered part 37 of the prism/lens array 25 contacts the upper surface of the prism-securing part 19. Steps corresponding to the tapered part 37 are formed on the upper surface of the prism-securing part 19 so that the tapered part 37 make contacts with the steps on the upper surface of the prism-securing part 19 when the prism/lens array 25 is inserted from the front side, and the positioning of the prism/lens array 25 in its front-back direction (the direction Z in the drawing) is conducted. At the same time, because the tapered part 37 is in contact with the steps, the prism/lens array 25 is pushed downwardly and is contact with the prism-securing part 19. Therefore, the positioning of the prism/lens array 25 in its top-bottom direction (the direction Y in the drawing) can be conducted.

Moreover, by inserting the prism/lens array 25 from the front side of the prism-securing part 19, the lid part becomes unnecessary. Also, by making the lenses 31 face downwardly, the distance between the lower surface of the prism/lens array 25 and the optical element can be increased. Therefore, the thickness of the bottom surface of the prism-securing part 19 can be increased. Therefore, an excellent productivity and an enhanced rigidity can be obtained.

Figure 15:
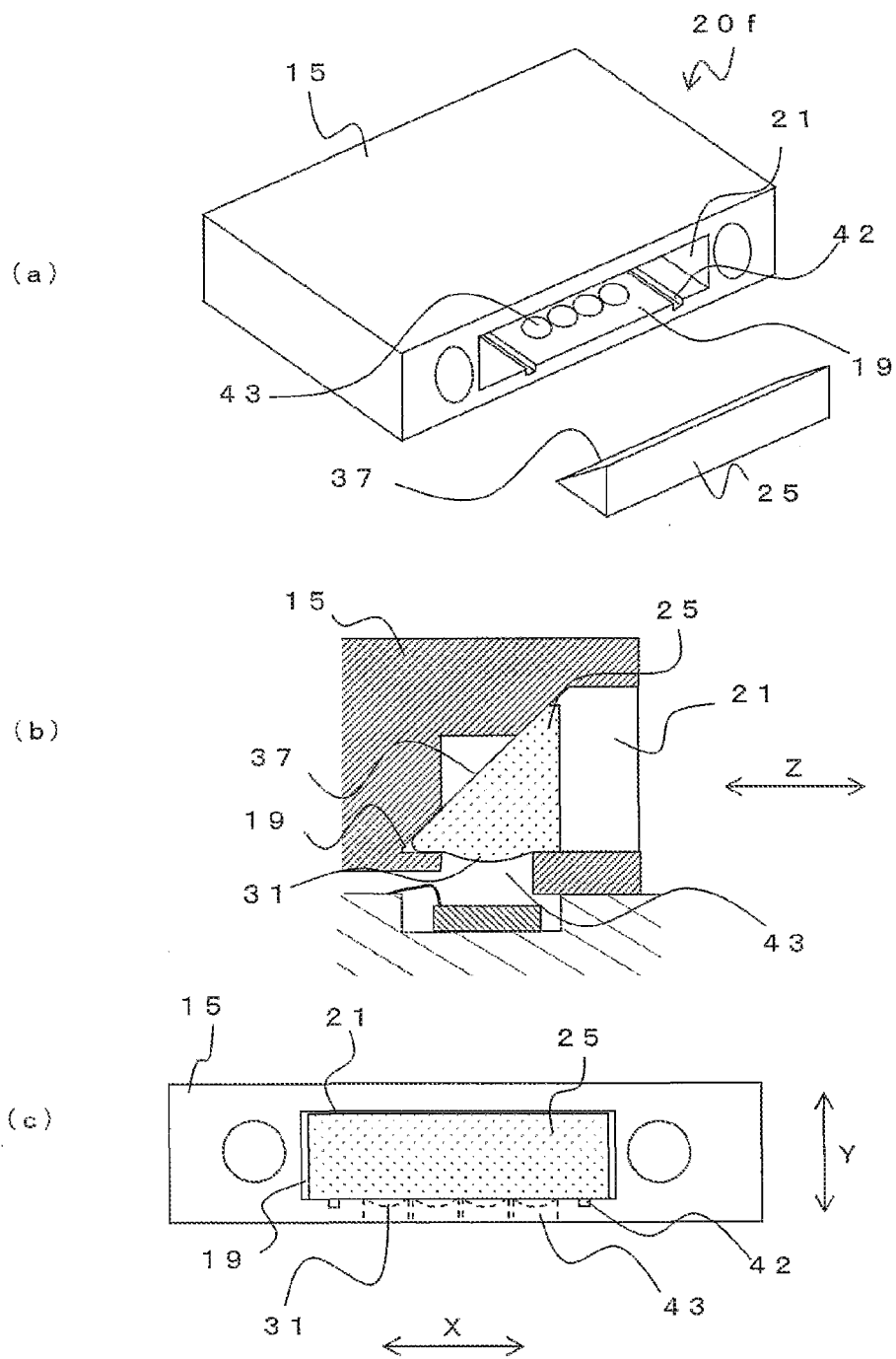
FIG. 15(a), FIG. 15(b), and FIG. 15(c) illustrate a fitting structure 20f.

Also, the fitting structure may be a fitting structure 20f as shown in FIG. 15. In the fitting structure 20f, the bottom surface of the prism-securing part 19 is blocked and bores 43 are formed. The bores 43 are formed on parts that correspond to the lenses 31 when the prism/lens array 25 is placed in the prism-securing part 19. Therefore, the convex shapes of the lenses 31 fit the bores 43. Therefore, the positioning of the prism/lens array 25 in its width direction (the direction X in the drawing) and its front-back direction (the direction Z in the drawing) can be conducted.

The tapered part 37 of the prism/lens array 25 is in contact with the upper surface of the prism-securing part 19. The upper surface of the prism-securing part 19 has a tapered shape corresponding to the tapered part 37. When the prism/lens array 25 is inserted from the front side, the tapered part 37 comes in contact with the tapered shaped upper surface of the prism-securing part 19. At this point, the prism/lens array 25 is pushed to the lower part of the prism-securing part 19 and comes in contact with the lower surface. Therefore, the positioning of the prism/lens array 25 in its top-bottom direction (the direction Y in the drawing) can be conducted. Also, by fitting the lenses 31 and the bores 43 together, it is unnecessary to process any other fitting structures and the like.

Also, grooves 42 are formed on both sides of the bores 43 of the prism-securing part 19 along its front-back direction. The grooves 42 prevent the adhesive from flowing into the surface on which the lenses 31 are formed. That is, there may be cases in which adhesive flows from the sides to the lower surface of the prism/lens array 25 when the prism/lens array 25 is placed in the prism-securing part 19. In these cases, the lenses 31 can be prevented from adhering to the adhesive.

Figure 16:
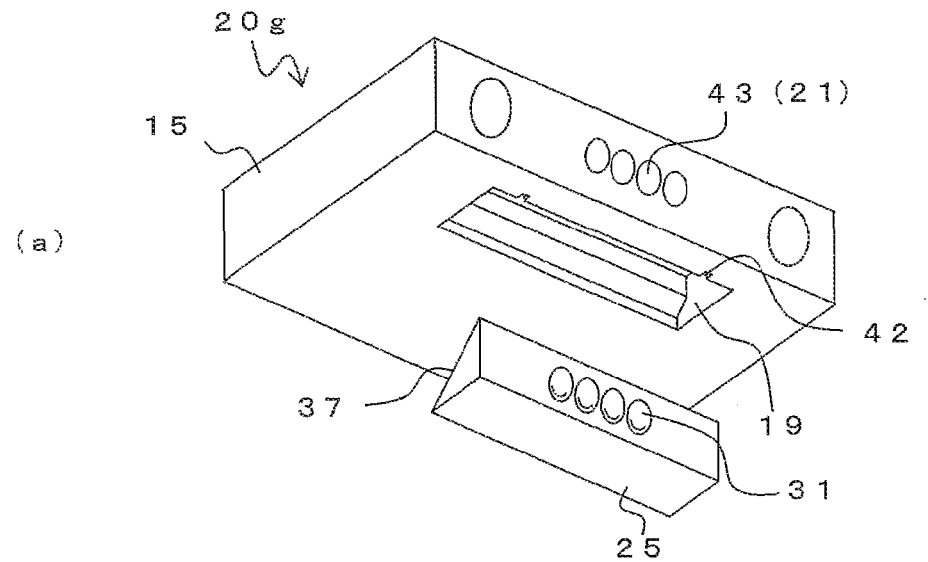
FIG. 16(a), FIG. 16(b), and FIG. 16(c) illustrate a fitting structure 20g.
Figure 16:
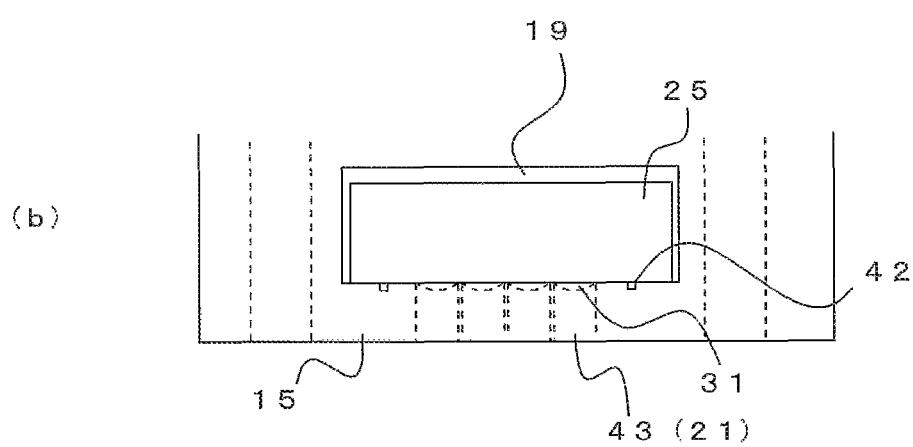
Figure 16:
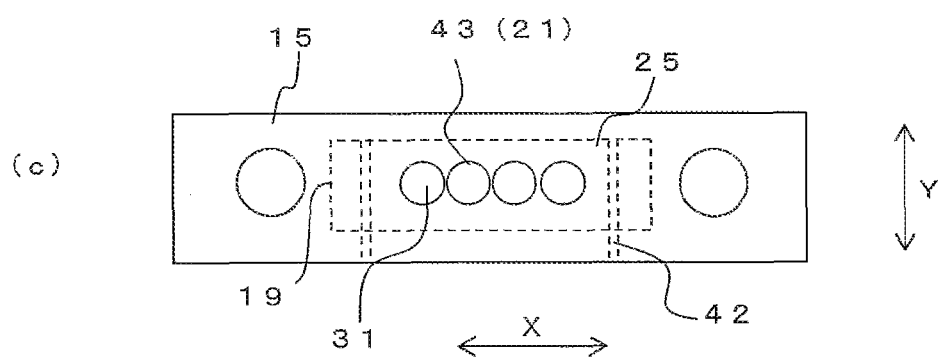

Also, the fitting structure may be a fitting structure 20g as shown in FIG. 16. In the fitting structure 20g, the prism/lens array 25 is inserted to the resin molded body 15 from below. That is, the bore on the lower part is formed corresponding to the size of the prism/lens array 25. The bores 43 corresponding to the lenses 31 are formed on the front surface of the prism-securing part 19. The lenses 31 and the bores 43 can fit together. That is, the lenses 31 and the bores 43 become a fitting structure. Therefore, the positioning of the prism/lens array 25 in its width direction (the direction X in the drawing) and in its height direction (the direction Y in the drawing) can be conducted.

Figure 17:
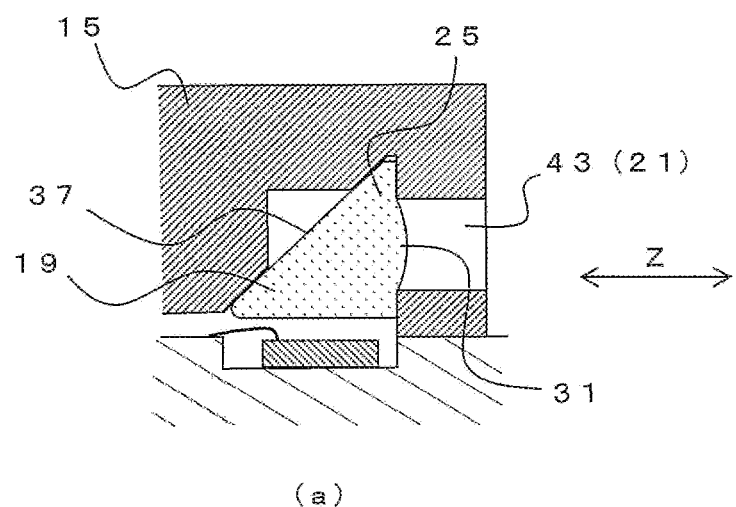
FIG. 17(a) and FIG. 17(b) show a contact structure of the prism/lens array 25 and the resin molded body 15 in the fitting structure 20g of FIG. 16.
Figure 17:
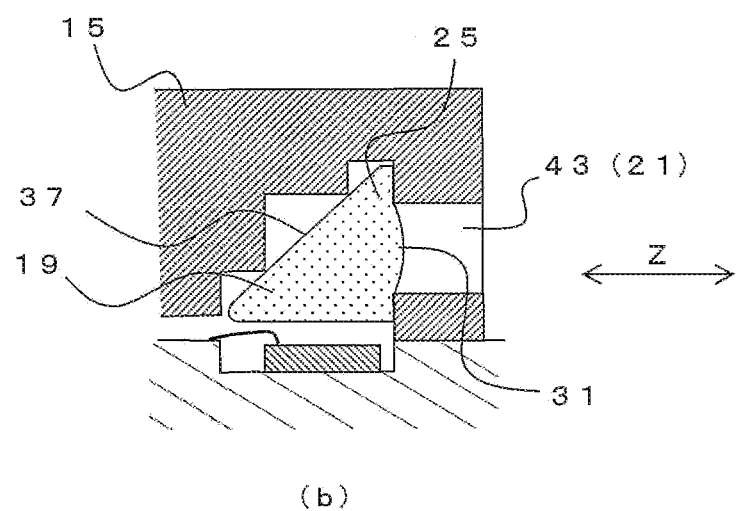

The contact state between the tapered part 37 of the prism/lens array 25 and the upper surface of the prism-securing part 19 may be a corresponding tapered form as shown in FIG. 17(a), or may be a corresponding stepped form as shown in FIG. 17(b).

That is, when the prism/lens array 25 is inserted to the prism-securing part 19, the tapered part 37 comes in contact with the steps or the tapered form on the upper surface of the prism-securing part 19. In this way, the positioning of the prism/lens array 25 in its front-back direction (the direction Z in the drawing) can be conducted.

The grooves 42 are formed along the top-bottom direction on both sides of the bores 43 of the prism-securing part 19. This prevents the adhesive from flowing in from the sides of the prism/lens array 25 and adhering to the lenses 31 when the prism/lens array 25 is placed in the prism-securing part 19.

Figure 18:
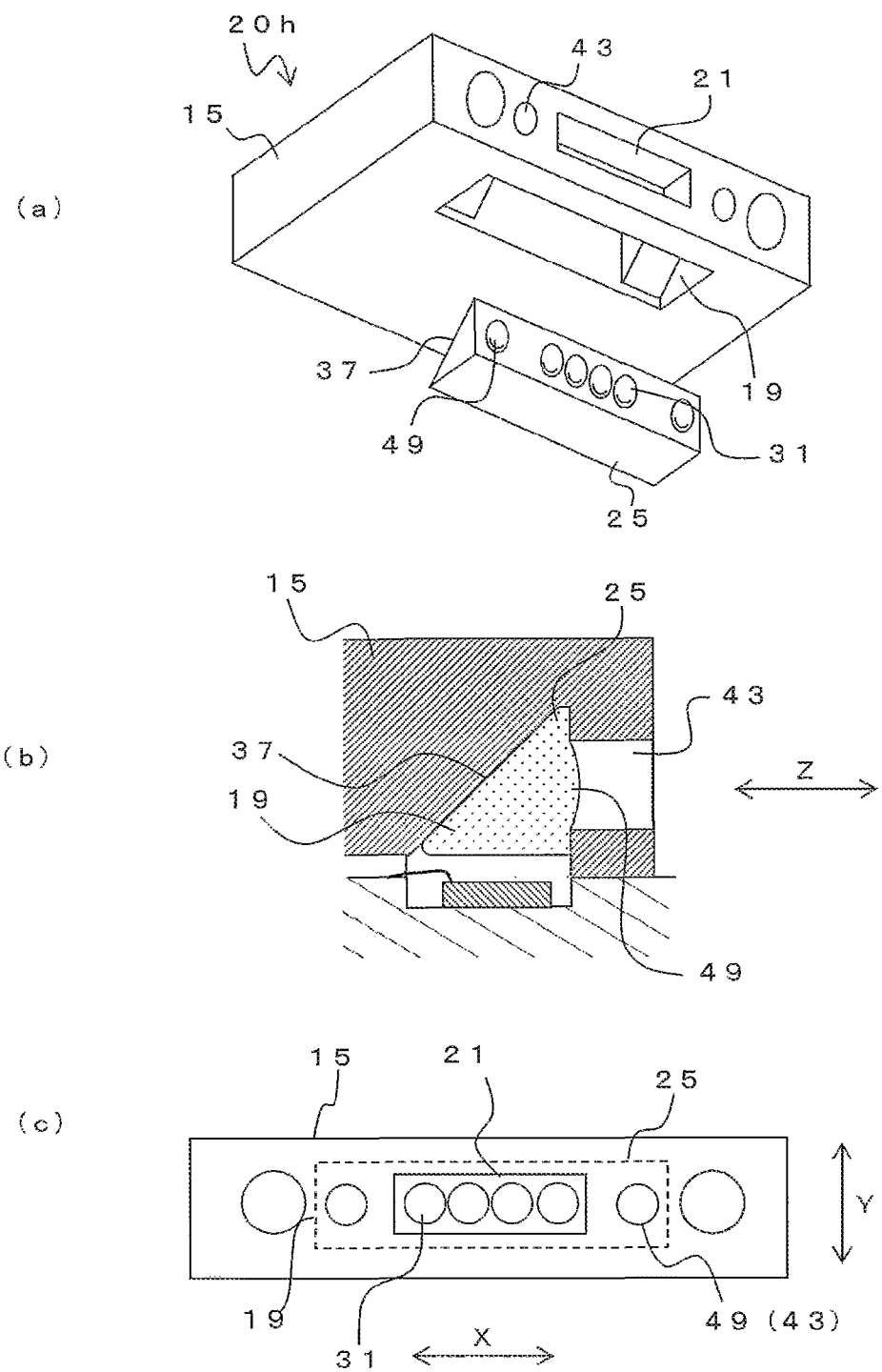
FIG. 18(a), FIG. 18(b), and FIG. 18(c) illustrate a fitting structure 20h.

Also, the fitting structure may be a fitting structure 20h as shown in FIG. 18. In the fitting structure 20h, dummy lenses 49 are formed to the fitting structure 20g. The dummy lenses 49, which have the similar shapes to the lenses 31, are formed on both sides of the lenses 31. Light does not enter into the dummy lenses 49 and the dummy lenses 49 perform no function as lenses.

The opening part 21, from which the lenses 31 can be exposed, is formed on the front surface of the prism-securing part 19. On both sides of the opening part 21, the bores 43 are formed on the parts that correspond to the dummy lenses 49. The dummy lenses 49 and the bores 43 can fit together. That is, the dummy lenses 49 and the bores 43 can become a fitting structure. Therefore, the positioning of the prism/lens array 25 in its width direction (the direction X in the drawing) and in its height direction (the direction Y in the drawing) can be conducted. Also, when the prism/lens array 25 is inserted to the prism-securing part 19, the tapered part 37 comes into contact with a tapered form of the upper surface of the prism-securing part 19. In this way, the positioning of the prism/lens array 25 in its front-back direction (the direction Z in the drawing) can be conducted.

It is easy to process the dummy lenses 49 because they have the same shapes as the lenses 31. Also, since the opening part 21 is larger than the region on which the lenses 31 are formed, the adhesive does not flow into the lenses 31.

Figure 19:
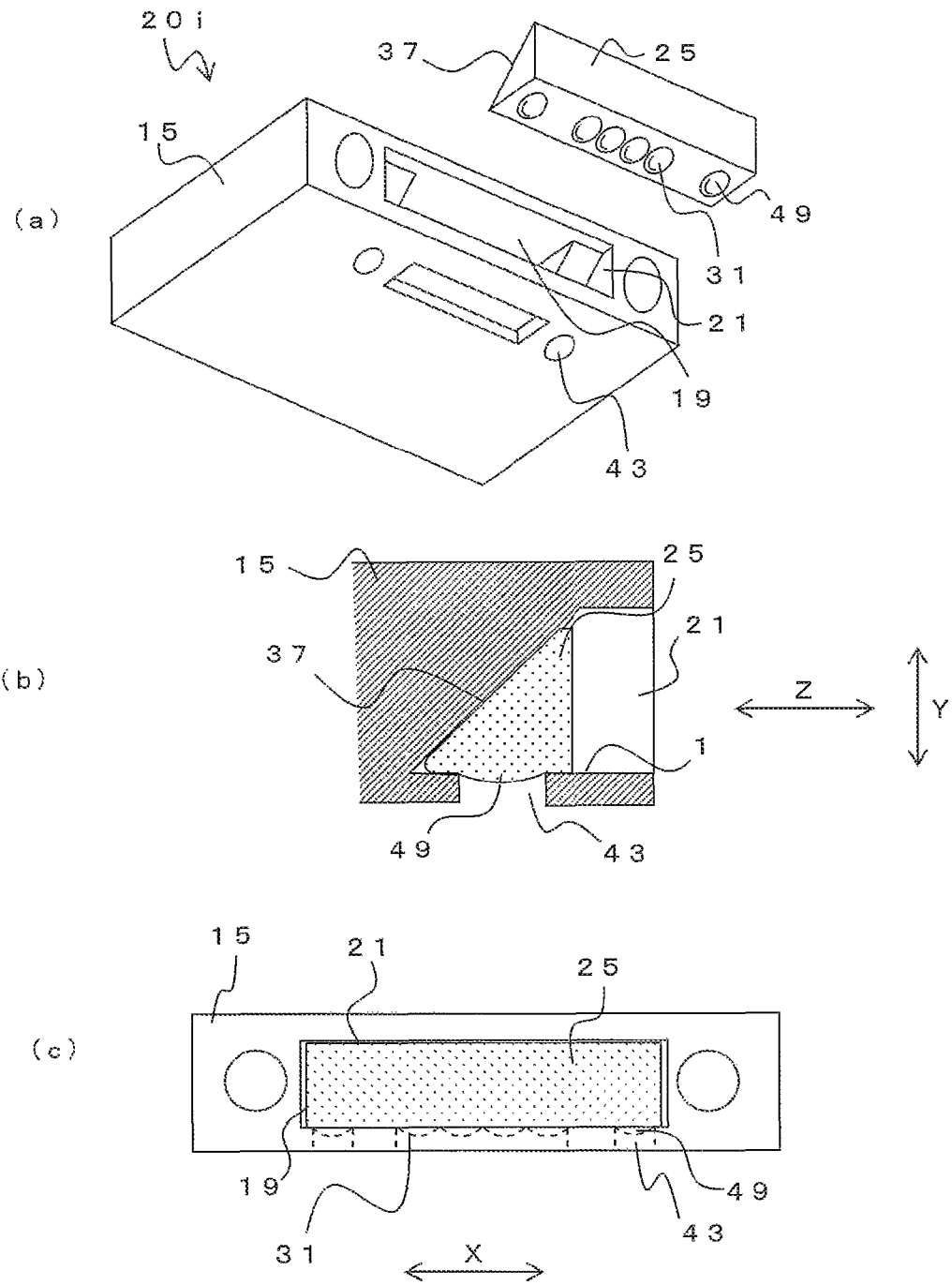
FIG. 19(a), FIG. 19(b), and FIG. 19(c) illustrate a fitting structure 20i.

Also, the fitting structure may be a fitting structure 20i as shown in FIG. 19. The direction of insertion of the prism/lens array 25 and the direction of the lenses 31 are altered from the fitting structure 20h. The prism/lens array 25 is inserted from the front side of the prism-securing part 19. The lenses 31 are formed on the lower surface of the prism/lens array 25. The dummy lenses 49 that have the same shapes as the lenses 31 are formed on both sides of the lenses 31.

A bore that can expose the lenses 31 is formed on the lower surface of the prism-securing part 19. On both sides of the bore, the bores 43 are formed on the parts that correspond to the dummy lenses 49. The dummy lenses 49 and the bores 43 can fit together. That is, the dummy lenses 49 and the bores 43 become a fitting structure. Therefore, the positioning of the prism/lens array 25 in its width direction (the direction X in the drawing) and in its front-back direction (the direction Z in the drawing) can be conducted.

Also, when the prism/lens array 25 is inserted to the prism-securing part 19, the tapered part 37 comes into contact with the tapered shape of the upper surface of the prism-securing part 19 and the prism/lens array 25 is pushed to the lower surface. In this way, the positioning in its height direction (the direction Y in the drawing) can be conducted.

Figure 20:
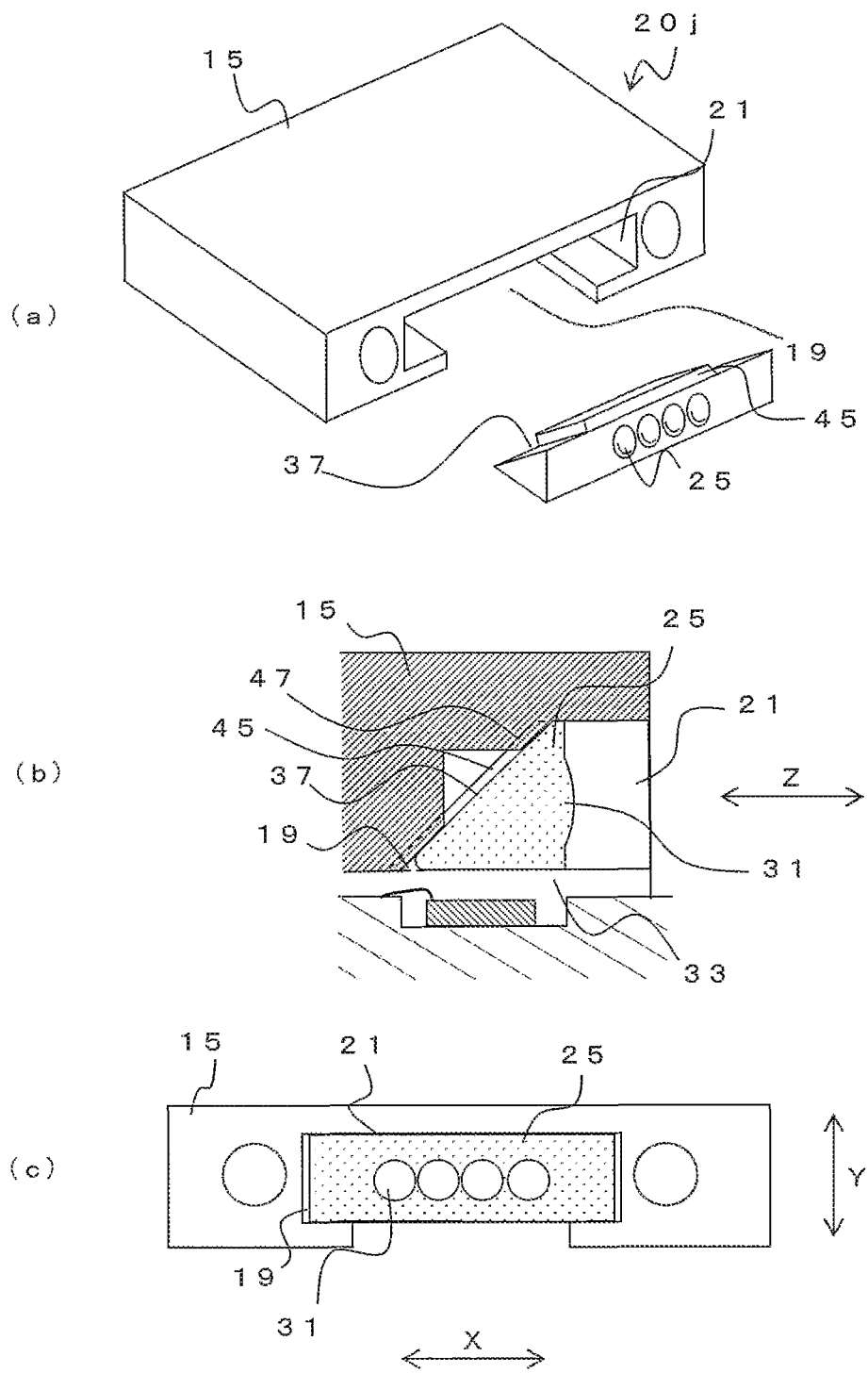
FIG. 20(a), FIG. 20(b), and FIG. 20(c) illustrate a fitting structure 20j.

Also, the fitting structure may be a fitting structure 20j as shown in FIG. 20. The convex part 45 may be formed on the tapered part 37 as in the fitting structure 20j. When the prism/lens array 25 is inserted to the prism-securing part 19, the tapered part 37 comes into contact with the tapered form on the upper surface of the prism-securing part 19.

In this case, the concave part 47 which corresponds to the convex part 45 is formed on the upper surface of the prism-securing part 19. In this way, the positioning of the prism/lens array 25 in its width direction (the direction X in the drawing) and in its front-back direction (the direction Z in the drawing) can be conducted. Also, when the tapered part 37 comes into contact with the tapered form of the upper surface of the prism-securing part 19, the prism/lens array 25 is pushed downwardly to the lower surface of the prism-securing part 19. Therefore the positioning of the prism/lens array 25 in its height direction (the direction Y in the drawing) can be conducted.

As described above, the disposition of the fitting structure for the positioning can be set accordingly as long as the positioning of the prism/lens array 25 in its width, height, and front-back directions is possible.

EXPLANATION OF NUMERALS

1 . . . optical module package
3a, 3b . . . case
5a, 5b . . . printed circuit board
7 . . . optical module
9 . . . circuit board
11 . . . optical element array
13 . . . heat generating element
15 . . . resin molded body
17 . . . heat releasing part
19 . . . prism-securing part
20a, 20b, 20c, 20d, 20e, 20f, 20g, 20h, 20i, 20j . . . fitting structure
21 . . . opening part
23 . . . guiding pin
25 . . . prism/lens array
27 . . . lid part
29 . . . heat releasing block
31 . . . lens
33 . . . protrusion
35 . . . groove
37 . . . tapered part
38 . . . wire
39 . . . tapered part
41 . . . heat releasing resin
42 . . . groove
43 . . . bore
45 . . . protrusion
47 . . . protrusion
49 . . . dummy lens

The invention claimed is:
1. An optical module, comprising:
a circuit board mounting an optical element array thereon;
a resin molded body disposed on the circuit board; and
a prism/lens array having lenses lined in its width direction, which can reflect light and is glass-made, wherein
the resin molded body has a prism-securing part which is provided on a part corresponding to the optical element array and can fix the prism/lens array therein, an opening part provided in the prism-securing part and formed toward an optical connector connected thereto, and a guiding part which conducts positioning of the optical connector,
a fitting structure for positioning the prism/lens array in its width direction is formed on a contact surface of the prism/lens array and the prism-securing part, and a front-back direction and a height direction of the prism/lens array is positioned by a contact of the prism/lens array and the prism-securing part, the fitting structure comprising a first fitting part formed integrally in a surface of the prism/lens array in a direction perpendicular to the lined direction of the lenses, and a second fitting part formed in a portion of prism-securing part corresponding to the first fitting part, and the second fitting part is configured to fit together with the first fitting part.

2. The optical module according to claim 1, wherein grooves are formed in parts of the prism-securing part corresponding to both sides of the lenses for preventing adhesive from entering the lenses.

3. The optical module according to claim 1, wherein the first fitting part comprises protrusions, and the second fitting part comprises grooves.

4. The optical module according to claim 3, wherein a pair of the protrusions and a pair of the grooves are formed on both sides of the lenses.

5. The optical module according to claim 1, wherein the lenses of the prism/lens array are formed toward the optical element array.

6. The optical module according to claim 1, wherein the prism/lens array is fixed on at least a bottom surface, side surfaces, and a front surface of the prism/lens array by adhesive in the prism-securing part.

7. The optical module according to claim 1, wherein a lid part is provided on the upper part of the prism/lens array placed in the prism-securing part,
the lid part is a block having an inclined part corresponding to an inclined surface of the prism/lens array, and the lid part is disposed such that the inclined part contacts the inclined surface.

8. The optical module according to claim 1, wherein a tapered part or a level difference shape which can contacts the inclined surface of the prism/lens array is formed on the upper part of the prism-securing part and the prism/lens array is positioned in its height direction by a contact of the prism/lens array and the tapered part or the level difference shape.

9. The optical module according to claim 1, wherein a heat generating element is disposed on the circuit board, a heat releasing part is formed in a part of the resin molded body corresponding to the heat generating element, a heat releasing block is provided in the heat releasing part, and heat generated from the heat generating element can be transmitted to the heat releasing block.

10. The optical module according to claim 3, wherein the protrusions have approximately V-shaped cross sections, and the grooves have approximately V-shaped cross sections.

11. An optical module, comprising:
a circuit board mounting an optical element array thereon;
a resin molded body disposed on the circuit board; and
a prism/lens array having lenses lined in its width direction, which can reflect light and is glass-made, wherein
the resin molded body has a prism-securing part which is provided on a part corresponding to the optical element array and can fix the prism/lens array therein, an opening part provided in the prism-securing part and formed toward an optical connector connected thereto, and a guiding part which conducts positioning of the optical connector,
a fitting structure for positioning the prism/lens array in its width direction is formed on a contact surface of the prism/lens array and the prism-securing part, and a front-back direction and a height direction of the prism/lens array is positioned by a contact of the prism/lens array and the prism-securing part,
a lid part is provided on the upper part of the prism/lens array placed in the prism-securing part, and the lid part is a block having an inclined part corresponding to an inclined surface of the prism/lens array, and the lid part is disposed such that the inclined part contacts the inclined surface.

12. An optical module, comprising:
a circuit board mounting an optical element array thereon;
a resin molded body disposed on the circuit board; and
a prism/lens array having lenses lined in its width direction, which can reflect light and is glass-made, wherein
the resin molded body has a prism-securing part which is provided on a part corresponding to the optical element array and can fix the prism/lens array therein, an opening part provided in the prism-securing part and formed toward an optical connector connected thereto, and a guiding part which conducts positioning of the optical connector,
a fitting structure for positioning the prism/lens array in its width direction is formed on a contact surface of the prism/lens array and the prism-securing part, and a front-back direction and a height direction of the prism/lens array is positioned by a contact of the prism/lens array and the prism-securing part, and
a tapered part or a level difference shape configured to contact the inclined surface of the prism/lens array is formed on the upper part of the prism-securing part and the prism/lens array is positioned in its height direction by a contact of the prism/lens array and the tapered part or the level difference shape.

* * * * *